United States Patent
Nashiki et al.

(10) Patent No.: US 7,825,561 B2
(45) Date of Patent: Nov. 2, 2010

(54) MOTOR WITH SIMPLIFIED STRUCTURE AND RELATED CONTROL DEVICE

(75) Inventors: Masayuki Nashiki, Komaki (JP); Shinji Makita, Kakamigahara (JP); Yoshinobu Kamada, Ichinomiya (JP)

(73) Assignee: Denso Corporation, Kariya (JP)

( * ) Notice: Subject to any disclaimer, the term of this patent is extended or adjusted under 35 U.S.C. 154(b) by 611 days.

(21) Appl. No.: 11/699,395

(22) Filed: Jan. 30, 2007

(65) Prior Publication Data

US 2007/0182266 A1   Aug. 9, 2007

(30) Foreign Application Priority Data

Feb. 8, 2006   (JP) .............................. 2006-031446

(51) Int. Cl.
*H02K 3/00* (2006.01)

(52) U.S. Cl. ...................................... 310/184; 310/179
(58) Field of Classification Search .................. 310/179, 310/184, 187
See application file for complete search history.

(56) References Cited

U.S. PATENT DOCUMENTS

| | | | |
|---|---|---|---|
| 3,465,225 A * | 9/1969 | O'Regan et al. ............ 318/696 |
| 4,733,113 A | 3/1988 | Smith | |
| 6,114,782 A * | 9/2000 | Lin et al. ................. 310/49.02 |
| 2005/0189843 A1 * | 9/2005 | Imai et al. .................... 310/257 |

FOREIGN PATENT DOCUMENTS

| JP | A 06-261513 | 9/1994 |
|---|---|---|
| JP | A 2005-261182 | 9/2005 |

OTHER PUBLICATIONS

Chinese Patent Office, "Chinese Office Action for Chinese Patent Application No. 20070003550.9 (with English translation)," dated Apr. 22, 2010, pp. 1-5 (pp. 1-10 for English translation).

* cited by examiner

*Primary Examiner*—Dang D Le
(74) *Attorney, Agent, or Firm*—Oliff & Berridge, PLC

(57) ABSTRACT

A brushless motor and a related control device are disclosed in a structure wherein a stator has U-phase, V-phase and W-phase stator poles, with two of the U-phase V-phase and W-phase stator poles carry thereon respective phase windings, in the absence of a selected phase winding related to a remaining one of the U-phase V-phase and W-phase stator poles. The respective phase windings have end portions connected together at a junction point. A three-phase alternating voltage is applied to the respective phase windings and the junction point to allow the stator to have an electromagnetic action thereby drivably rotating a rotor. The stator poles may be formed in trapezoid shapes to minimize interference between associated component parts for easy assembly in high productivity and efficiency with a reduction in torque ripple.

5 Claims, 16 Drawing Sheets

MOTOR WITH SIMPLIFIED STRUCTURE AND RELATED CONTROL DEVICE

CROSS REFERENCE TO RELATED APPLICATIONS

This application is based on Japanese Patent Application No. 2006-31446, filed on Feb. 8, 2006, the content of which is hereby incorporated by reference.

BACKGROUND OF THE INVENTION

1. Field of the Invention

The present invention relates to motors installed on motor vehicles and trucks and related control devices and, more particularly, to a motor and a related control device for controlling such a motor.

2. Description of the Related Art

Attempts have heretofore been made to provide brushless motors for use in motor vehicle. Such brushless motors include stator poles carrying thereon coils of concentrated windings for respective phases and one of such brushless motor is disclosed in, for instance, Japanese Patent Unexamined Application Publication No. 6-261513 on FIGS. 1 to 3 thereof.

FIG. 27 is a cross sectional view showing a schematic structure of such a related art brushless motor and FIG. 28 is a cross sectional view taken on line AA-AA of FIG. 27.

The brushless motor, shown in FIGS. 27 and 28, takes the form of a four-pole and six-slot type brushless motor. The brushless motor includes a stator, having a winding structure composed of a so-called concentrated winding, which has stator poles carrying thereon respective-phase coils wound in concentrated winding patterns.

The brushless motor comprises a stator core 4 supported with a motor housing 6 and carrying thereon a stator winding 5, and a rotor core 2 rotatably disposed inside the stator core 4 and carried on a rotor shaft 1 that is rotatably supported with the motor housing 6 by means of a pair of bearings 3 mounted thereon.

The stator core 4 has a first pair of radially inwardly protruding U-phase salient poles TBU1, TBU2, a second pair of radially inwardly protruding V-phase salient poles TBV1, TBV2, and a third pair of radially inwardly protruding W-phase salient poles TBW1, TBW2. The U-phase salient poles TBU1, TBU2 carry thereon U-phase windings WBU1, WBU2. The v-phase salient poles TBV1, TBV2 carry thereon V-phase windings WBV1, WBV2. Likewise, the W-phase salient poles TBW1, TBW2 carry thereon W-phase windings WBW1, WBW2.

FIG. 29 shows a deployment diagram of the stator with a status deployed in a circumferential direction thereof in one turn for illustrating a placement relationship among the U-phase, V-phase and W-phase windings. The abscissa is plotted in an electrical angle with the one turn being formed at an angle of 720°.

As shown in FIG. 29, the U-phase windings WBU1, WBU2 are electrically connected to each other. The V-phase windings WBV1, WBV2 are electrically connected to each other. Likewise, the W-phase windings WBW1, WBW2 are electrically connected to each other. The U-phase winding WBU2, the V-phase winding WBV2 and the W-phase winding WBW2 are connected at a neutral junction N in a star connection.

As shown in FIGS. 27 and 28, the rotor core 2 has an outer periphery carrying thereon permanent magnets 7 each magnetized in N-pole and permanent magnets each magnetized in S-pole that are alternately positioned on the outer periphery of the rotor core 2. The brushless motor, formed in such a structure, has heretofore been used extensively for industrial and domestic applications.

Another type of a three-phase alternating current motor has been proposed as disclosed in U.S. Patent Application Publication No. US2005/0189843A1.

FIG. 30 is a cross sectional view showing such a three-phase alternating current motor with four poles in twelve slots. FIGS. 31 and 32 are layout diagrams showing the relationship between shapes of stator poles, as viewed from an inner peripheral area of a stator shown in FIG. 30, and associated windings carried on the stator poles that are deployed in a straight form and plotted on the abscissa in terms of an electric angle on a circumferential direction. Since the three-phase alternating current motor has the four poles, a whole circumference of the stator is illustrated in an electric angle from 0° to 720°.

FIG. 31 shows an exemplary case in which the stator winding is arranged in a lap winding pattern and FIG. 32 shows another exemplary case in which the stator winding is arranged in a wave winding pattern.

As shown in FIG. 30, the three-phase motor M of the related art comprises a stator S fixedly supported in a motor housing 6 and having an inner circumferential periphery formed with a plurality of radially inwardly facing stator poles 11 to 22, a stator winding SW wound on the stator poles 11 to 22, a rotor 2 having an outer periphery alternately formed with N-poles 7 and S-poles 8. As shown in FIG. 1A, the stator 6 also has slots S11 to S22 formed circumferentially adjacent to the stator poles S11 to S22, respectively.

As shown in FIGS. 30 and 31, the slots S22, S16 accommodate therein U-phase windings 23, 29 and the slots S13, S19 accommodate inverted U-phase windings 26, 32. Likewise, the slots S12, S18 accommodate therein V-phase windings 25, 31 and the slots S15, S21 accommodate inverted V-phase windings 28, 34. Similarly, the slots S14, S20 accommodate therein W-phase windings 27, 33 and the slots S17, S11 accommodate inverted W-phase windings 30, 24.

The motor MA, shown in FIG. 32, differs from the motor M shown in FIGS. 30 and 31 in respect of winding patterns with each winding in each slot having the same number of turns as that of turns of each winding in each slot in the stator shown in FIGS. 30 and 31. With the motors M and MA, the U-phase V-phase and W-phase windings are applied with three phase alternating excitation current in the same manners, with both motors M and MA generating torque outputs in the same electromagnetic actions to be driven in the same manner.

FIG. 33 shows another example of a three-phase alternating current motor MB having a stator SB including stator poles each formed in a substantially triangular shape as viewed from an outer periphery of a rotor (not shown). The stator SB has the triangular stator poles 11x to 22x that are plotted in FIG. 33 in a deployed form in terms of an electrical angle from 0° to 720°. The stator SB includes U-phase windings 23x, 29x and inverted U-phase windings 26x, 32x. Likewise, the stator SB includes V-phase windings 25x, 31x and inverted V-phase windings 28x, 34x. Similarly, the stator SB includes W-phase windings 27x, 33x and inverted W-phase windings 30x, 24x.

The stator SB differs from the stator SA of the motor MA, shown in FIG. 32, in that the stator winding of the stator SB is arranged in a trapezoid configuration whereas the stator winding of the stator SA is arranged in a rectangular configuration. The stator winding of the motor MB, shown in FIG. 33, has features in that a winding length can be shortened with the occurrence of less overlapping area between windings of coil end portions in two phases and respective windings are bent at obtuse angles. This results in capability of minimizing the coil end portions of the windings, providing an ease of fabricating the windings and reducing production cost. Another advantage of such a motor has an effect in which the stator is skewed in a circumferential direction.

The related art brushless motor, shown in FIGS. 27 and 28, is a three-phase alternating current motor of a so-called concentrated winding structure. The motor windings need to be wound on respective stator poles, causing the motor to be complicated in structure. In addition, the motor windings need to be located in the slots at the back thereof, causing an issue to arise with a drop in productivity in winding the motor windings. Further, due to such a structure, an issue arises with the occurrence of a difficulty in miniaturizing the motor in high efficiency at low cost. Furthermore, since the stator has a structure formed with only three salient poles in an electric angle of 360°, the motor is hard to allow the stator to generate a magnetomotive force in a sine wave pattern to precisely generate a rotating magnetic field. This results in an issue with a difficulty of applying such a structure to synchronous reluctance motors, various motors utilizing reluctance torque or induction motors.

Further, the stator having the motor windings formed in lap winding, shown in FIGS. 30 and 31, can be formed in full-pitch winding and distributed winding, enabling the stator to generate an electromotive force distribution in a smooth sine wave pattern. However, the windings need to be inserted to respective slots through opening portions, causing an issue to arise with a decrease in space-occupation ratio of the windings. Another issue arises in which the coil end of the winding has an elongated axial length, causing a difficulty of miniaturizing a motor. In addition, still another issue arises with a drop in productivity of the windings. The stator having the motor windings formed in wave winding, shown in FIG. 32, has the same issue as that of the stator shown in FIG. 31.

SUMMARY OF THE INVENTION

The present has been completed with a view to addressing the above issues and has an object to provide a motor that achieves a simplification in winding to simplify a motor structure with a simplified winding structure available to form and place windings in condition for easy assembly. This results in capability for the motor to be manufactured in high productivity while achieving a simplified manufacturing method. This enables the motor to have an increased space-occupation ratio of the windings, while enabling improvement in efficiency. With these effects in combination, the present invention can provide a motor that can achieve improved productivity, miniaturization, high efficiency and low cost.

A first aspect of the present invention provides a three-phase alternating current motor, comprising a stator including first phase stator poles carrying thereon a first phase winding selected from a U-phase winding, a V-phase winding and a W-phase winding, second phase stator poles carrying thereon a second phase winding selected from the U-phase winding, the V-phase winding and the W-phase winding and third phase stator poles in the absence of a third phase winding selected from the U-phase winding, the V-phase winding and the W-phase winding, and a rotor rotatably supported inside the stator poles of the stator. The first and second phase windings are excited with excitation currents obtained by synthesizing a three-phase alternating current to allow the stator to electromagnetically generate a three-phase alternating electromagnetic action through which the rotor is driven.

With such a structure of the three-phase alternating current motor, the U-phase winding, the V-phase winding and the W-phase winding, one phase winding is removed, thereby achieving further simplification in a winding structure of the stator. For instance, with the stator formed with only a U-phase winding and a W-phase winding in the absence of a V-phase winding, the U-phase winding is excited with a U-phase current Iu and a V-phase current –Iv in negative potential and the W-phase winding is excited with a W-phase current Iw and the V-phase current –Iv in negative potential. This causes the U-phase winding and the W-phase winding to provide an electromagnetic action for an excitation current of the V-phase winding. Such a winding structure may be applied to a motor structure having multi-phase windings wound on the stator in lap winding, wave winding or so-called concentrated winding patterns.

With the winding structure mentioned above, excitation current of each of the U-phase winding and the W-phase winding is 1.732 times the current of a phase winding of a normal three-phase brushless motor and, simply considered, a copper loss of the motor increases to a value of two times. However, upon making an effective use of a vacant space resulting from the absence of the V-phase winding and increasing a space-occupation ratio of the windings due to simplification of the windings, the three-phase motor of the present invention has a copper loss lying at the same extent. In addition, the simplified winding structure results in improvement in productivity of the motor.

Further, with the stator having a wave winding structure, the placement of the windings can be converted, making it possible to assemble the motor in an easy way. In addition, such a winding structure enables the stator to be assembled in an easy fashion upon placing the stator in an axial direction of the rotor with no occurrence of interference between associated component parts or with minimized interference between the associated component parts. With the windings fabricated in a simplified winding pattern and forming, the motor can be manufactured in remarkably increased productivity with the windings placed in high space-occupation ratios.

While there are many probabilities for the motor to normally have windings arranged in a star connection, the stator may take the form of a winding structure in which a V-phase winding of a delta winding is removed. This allows a three-phase inverter, widely used in industrial or domestic uses, to be utilized in high efficiency. In addition, the motor has three terminals that allow three phase currents Iu, Iv, Iw to be freely controlled. This results in capability of achieving current control, such as an expedient for controlling third-order harmonic current, which would be difficult to be achieved in the related art motor designed in a star connection.

Further, a stator core may be modified in configuration into a three dimensional core with a structure wherein a coil end of the winding does not protrude from both end faces of the stator core in an axial direction of a rotor without causing any sacrifice to advantageous features of the present invention.

A second aspect of the present invention provides a two-phase alternating current motor comprising a stator having stator poles, each formed in one of a substantially triangular shape and a substantially trapezoid shape, which carry an A-phase winding and a B-phase winding that are wound on the stator poles in wave winding patterns, respectively, and a rotor rotatably disposed inside the stator poles of the stator.

With such a two-phase alternating current motor, the windings can be formed at less bending angles, providing an ease of fabricating the windings and assembling the windings on the stator. Also, such a winding structure results in a reduction in size of a coil end portion with the resultant ease of fabricating the windings and minimizing a size of the windings while enabling production of the motor at low cost.

A third aspect of the present invention provides a control device for a brushless motor having a stator formed with a U-phase stator pole carrying thereon a U-phase winding, a V-phase stator and a W-phase stator carrying thereon a W-phase winding wherein the first and second phase windings having end portions connected to each other at a junction point. The control device comprises a three-phase inverter including a first output terminal connected to the junction point to which the first and second phase windings are connected, a second output terminal connected to the first phase winding, and a third output terminal connected to the second phase winding.

With such a control device, the brushless motor can be driven with three-phase excitation currents in high efficiency, while permitting the motor to be formed in a simplified structure upon eliminating one of three phase windings.

DETAILED DESCRIPTION OF THE PREFERRED EMBODIMENTS

Figure 1:
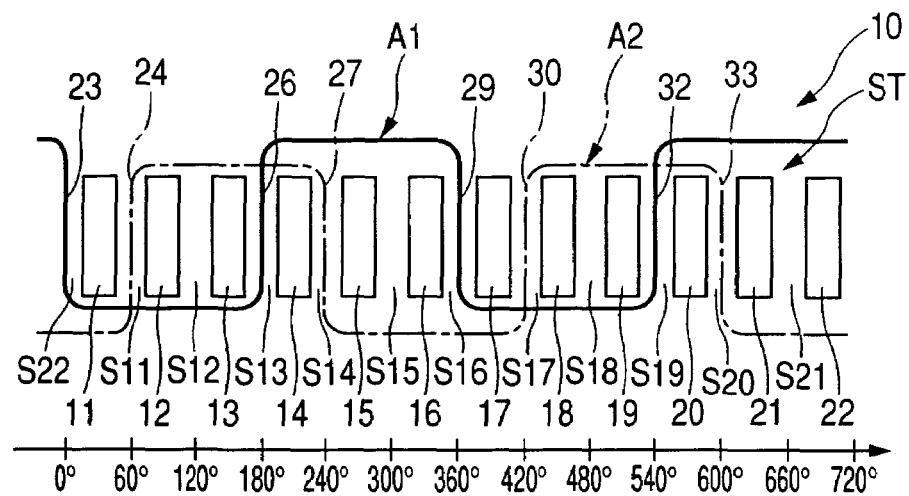
FIG. 1 is a deployment diagram showing a three-phase alternating current motor of a first embodiment according to the present invention with a stator deployed in a circumferential direction thereof in terms of electric angles.

Now, motors of various embodiments and related control device according to the present invention are described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, like reference characters designate like or corresponding parts throughout the several views. Also in the following description, description on the same component parts of one embodiment as those of another embodiment is omitted, but it will be appreciated that like reference numerals designate the same component parts throughout the drawings.

Now, a brushless motor of a first embodiment according to the present invention is described below with reference to FIG. 1. The brushless motor 10, shown in FIG. 1, has the same mechanical structure as the four-pole three-phase motor M shown in FIGS. 30 and 31 except for an essential feature of the present invention and the same component parts as those of the motor, shown in FIGS. 30 and 31, bear like reference numerals.

Figure 30:
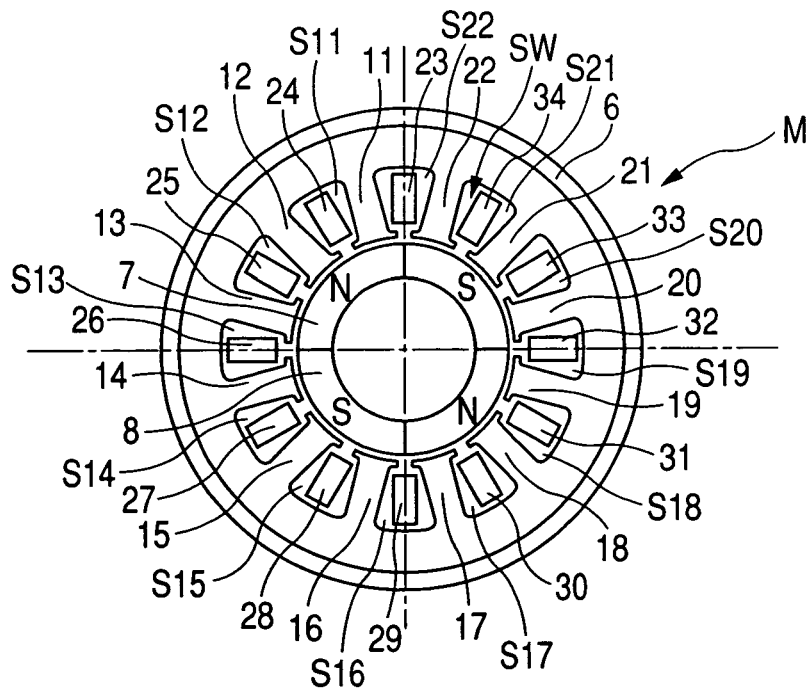
FIG. 30 is a cross sectional view showing a schematic structure of another brushless motor of the related art.
Figure 31:
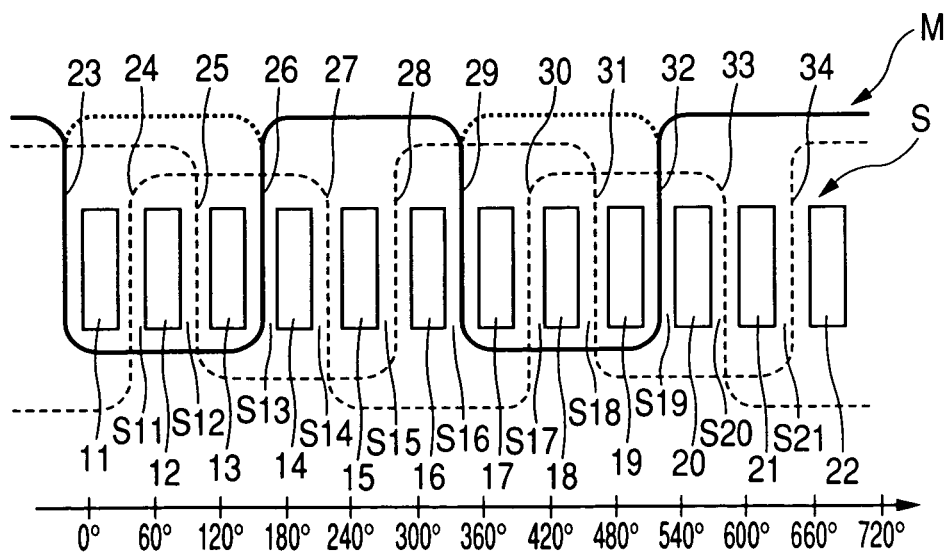
FIG. 31 is a deployment view of a stator showing the relationship between stator poles and windings of the related art motor shown in FIG. 30.

The present invention has the essential feature in that among the three phase windings 23, 24, 25 of the stator S shown in FIGS. 30 and 31, a single phase winding is omitted. For instance, the V-phase winding may be omitted. In such a case, the windings 25, 28, 31, 34 are removed from the stator S shown in FIG. 31. Under such a winding structure, the U-phase winding is excited with an excitation current of Iu-Iv that is a sum of a U-phase current Iu and a V-phase current –Iv. Likewise, the W-phase winding is excited with an excitation current of Iw-Iv that is a sum of a W-phase current Iw and the V-phase current –Iv. With the U-phase winding and the W-phase winding excited with such excitation currents in the absence of the V-phase winding, the motor 10 of the present embodiment can generate the same three-phase alternating electromagnetic action as that of the three-phase motor shown in FIGS. 30 and 31.

FIG. 1 shows an exemplary structure of a wave-winding type motor of the present embodiment. The motor 10 of the present embodiment comprises a stator ST that has the same structure as the stator SA, shown in FIG. 32, except for a structure wherein the windings 25, 28, 31, 34 are removed from the wave windings shown in FIG. 32.

More particularly, the stator ST of the motor 10 of the present embodiment has an inner circumferential periphery formed with a plurality of radially inwardly facing stator poles 11 to 22, a first phase winding A1 composed windings 23, 26, 29, 32 accommodated in slots S22, S13, S16, S19, respectively, a second phase winding A2 composed windings 24, 27, 30, 33 accommodated in slots S11, S14, S17, S20, respectively, a rotor (not shown) rotatably supported inside the stator ST and having an outer circumferential periphery provided with permanent magnets magnetized in N-poles and S-poles in four poles.

Thus, no phase winding corresponding to the V-phase winding is wound on the stator ST.

In FIG. 1, the abscissa axis is plotted in an electrical angle and takes one turn in the electric angle of 720°.

While the motor 10 of the present embodiment is herein described with reference to an exemplary structure with the V-phase winding being removed, the present invention is not limited to such an exemplary structure. It is needless to say that the U-phase winding or the W-phase winding may be removed in place of the V-phase winding in modified structures.

Modified Form of First Embodiment

Figure 2:
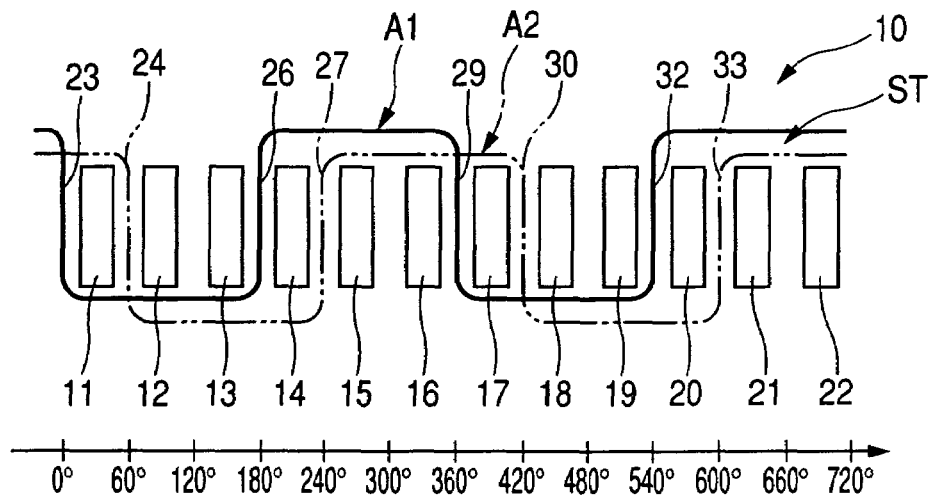
FIG. 2 is another deployment diagram showing a modified form of the three-phase alternating current motor of the first embodiment shown in FIG. 1.

FIG. 2 shows an exemplary wiring diagram of a stator winding in modified form of the stator winding of the motor 10 shown in FIG. 1.

In the modified winding pattern shown in FIG. 2, the windings 24, 27, 30, 33 of the W-phase winding A2 are wound in a direction opposite to those of the windings 24, 27, 30, 33 of the W-phase winding A2 shown in FIG. 1. Accordingly, the W-phase winding is connected in opposite wire connection to allow the same current to flow through the winding portions 24, 27, 30, 33. The winding structures, shown in FIGS. 1 and 2, encounter different interfering consequences and, thus, the winding structures may be chosen depending on a manufacturing method.

Second Embodiment

A brushless motor 10A of a second embodiment according to the present invention is described below with reference to FIG. 3.

With the brushless motor 10A of the present embodiment, a stator STA has circumferentially spaced stator poles 40 to 51 formed at equidistant positions in triangular configurations, respectively, with the triangular stator poles being alternately disposed on a common circumferential line of the stator STA. The stator STA has slots S40 to S51 each formed between adjacent stator poles.

With the brushless motor 10A of the present embodiment, the stator STA comprises a U-phase winding 53 and a W-phase winding 54 in the absence of a V-phase winding.

Figure 3:
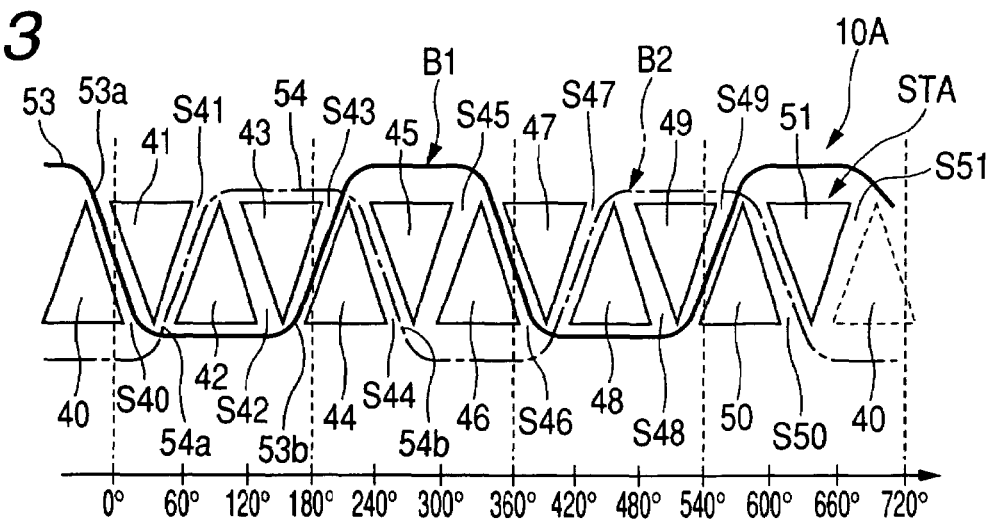
FIG. 3 is a deployment diagram showing a three-phase alternating current motor of a second embodiment according to the present invention with a stator deployed in a circumferential direction thereof in terms of electric angles.

More particularly, as shown in FIG. 3, the U-phase winding 53 has a winding 53a accommodated in the slot S40, a winding 53b accommodated in the slot S43, a winding 53c accommodated in the slot S46 and a winding 53d accommodated in the slot S49. Likewise, the W-phase winding 54 has a winding 54a accommodated in the slot S41, a winding 54b accommodated in the slot S44, a winding 54c accommodated in the slot S47 and a winding 54d accommodated in the slot S50.

As shown in FIG. 3, no third phase winding corresponding to the V-phase winding is wound in the slots S42, S45, S48, S51 of the stator STA.

In FIG. 3, the abscissa axis is plotted in an electrical angle and takes one turn in the electric angle of 720°.

With such a structure mentioned above, the motor 10A of the present embodiment have various advantageous effects. That is, since the U-phase winding 53 and the W-phase winding 54 are bent at less bending angles, respectively, the stator winding can be easily manufactured. In addition, the U-phase winding 53 and the W-phase winding 54 have minimized coil end portions, respectively, resulting in an ease of manufacturing the stator winding in a small size at low cost. Moreover, the motor 10A of the present embodiment has an electromagnetic action with an effect in which the stator is skewed in a circumferential direction. This results in remarkable reduction in torque ripple with minimized cogging torque, thereby realizing smooth operation of the motor with low vibration.

In alternatives, the triangular stator poles of the stator 6A can take various configurations. That is, the triangular stator poles of the stator 6A may be modified into trapezoid shapes, respectively. Further, the triangular stator poles of the stator STA may have rounded corners if desired.

Figure 4:
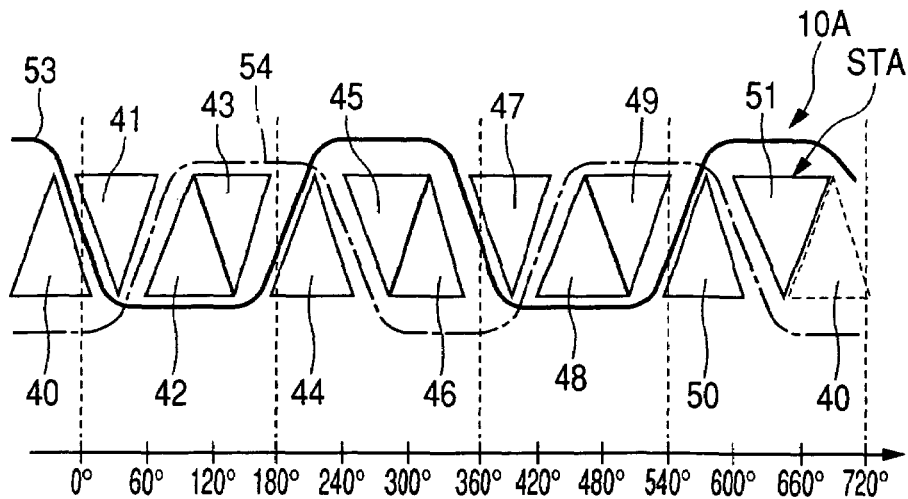
FIG. 4 is a deployment diagram showing a modified form of the three-phase alternating current motor of the second embodiment shown in FIG. 3.

In another alternative, the adjacent stator poles 42, 43 with no winding in the slot S42, the adjacent stator poles 45, 46 with no winding in the slot S45, the adjacent stator poles 48, 49 with no winding in the slot S48 and the adjacent stator poles 51, 40 with no winding in the slot S51 may be merged into combined stator poles in rhombic shapes, respectively, as shown in FIG. 4.

Third Embodiment

Figure 5:
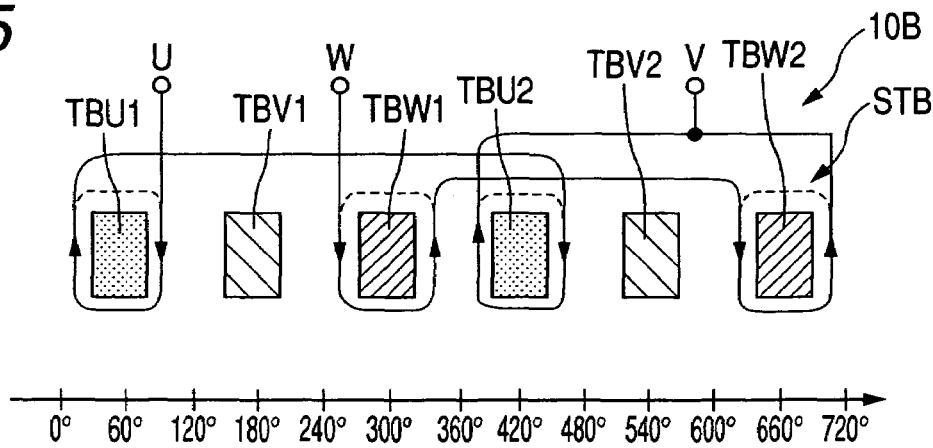
FIG. 5 is a deployment diagram showing a three-phase alternating current motor of a third embodiment according to the present invention with a stator deployed in a circumferential direction thereof in terms of electric angles.

A brushless motor 10B of a third embodiment according to the present invention is described below with reference to FIG. 5.

With the brushless motor 10B of the present embodiment, a stator STB comprises concentrated windings such as a U-phase winding composed of U-phase coils TBU1 and TBU2 electrically connected to each other, with a U-phase coil TBU1 having an input connected to a U-phase input terminal, and a W-phase winding composed of W-phase coils TBW1 and TBW2 electrically connected to each other with the W-phase coil TBW1 having an input connected to a W-phase input terminal.

The U-phase coil TBU2 and the W-phase coil TBW2 have respective output terminals connected to a V-phase terminal. With such a circuit diagram, with the stator STB of the present embodiment, the U-phase coil TBU1 is wound in a clockwise direction. In contrast, with the stator of the related art brushless motor shown in FIG. 29 including the three phase windings, the U-phase coil TBU1 is wound in a counterclockwise direction.

Fourth Embodiment

Figure 27:
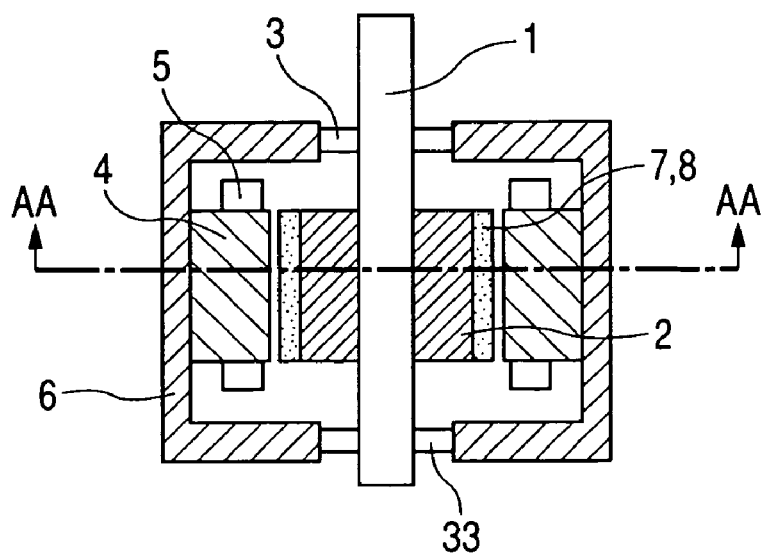
FIG. 27 is a cross sectional view showing a schematic structure of the related art brushless motor.

A brushless motor 10C of a fourth embodiment according to the present invention is described below with reference to FIG. 6. The brushless motor 10C of the present embodiment has the same structure as the related art motor, shown in FIGS. 27 to 29, except for a stator STC incorporating a stator winding formed in a wave winding pattern.

That is, the stator STC comprises a first pair of inwardly protruding U-phase salient stator poles 61, 64, a second pair of inwardly protruding V-phase salient stator poles 62, 65 and a third pair of inwardly protruding W-phase salient stator poles 63, 66, in which a rotor (not shown), carrying thereon permanent magnets in N-poles and permanent magnets in S-poles, is rotatably supported.

With the brushless motor 10C of the present embodiment, a U-phase winding 67, a V-phase winding 68 and a V-phase winding 69 are wound on the associated salient stator poles of the stator STC in wave winding patters.

More particularly, the U-phase winding 67 comprises a first winding portion 67a wound on the stator pole 61 and a second winding portion 67b wound on the stator pole 64. The V-phase winding 68 comprises a first winding portion 68a wound on the stator pole 62 and a second winding portion 68b wound on the stator pole 65. The W-phase winding 69 comprises a first winding portion 69a wound on the stator pole 63 and a second winding portion 69b wound on the stator pole 66.

Figure 29:
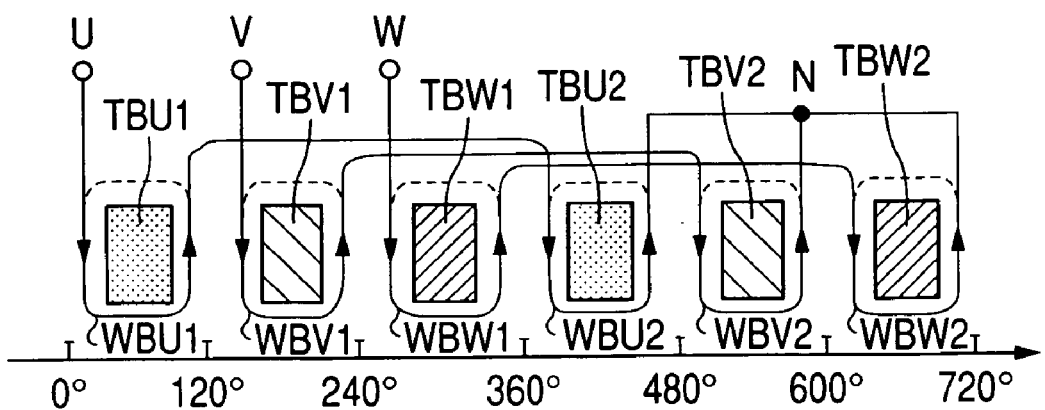
FIG. 29 is a deployment view of a stator showing the relationship between stator poles and windings of the related art motor shown in FIG. 28.

With such a structure of the brushless motor 10C, the stator winding of the stator STC has the same function as that shown in FIG. 29.

A brushless motor 10D of a fifth embodiment according to the present invention is described with reference to FIG. 7.

Figure 6:
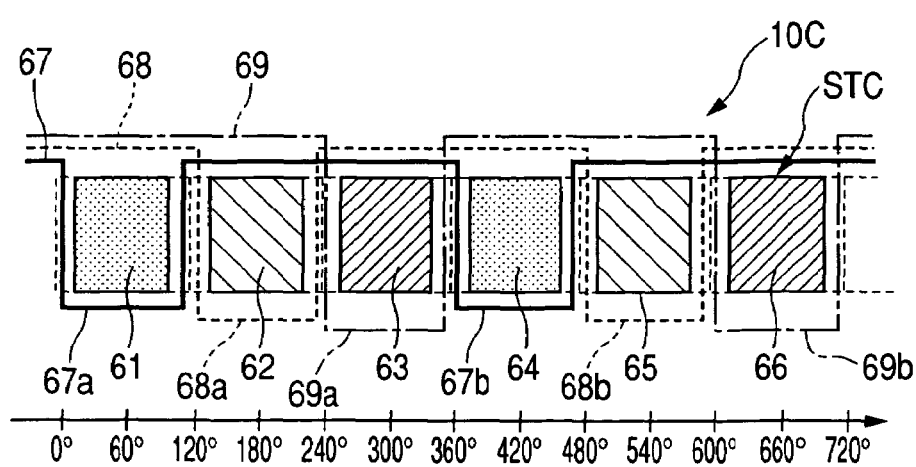
FIG. 6 is a deployment diagram showing a three-phase alternating current motor of a fourth embodiment according to the present invention with a stator deployed in a circumferential direction thereof in terms of electric angles.

With the brushless motor 10D of the present embodiment, a stator STD includes the U-phase winding 67 and the W-phase winding 69 with the V-phase winding 68 being removed from the structure of the stator STC shown in FIG. 6.

More particularly, the U-phase winding 67 comprises the first and second winding portions 67a, 67b wound on the U-phase stator poles 61, 64, respectively. The W-phase winding 69 comprises the first and second winding portions 69a, 69b wound on the W-phase stator poles 63, 66, respectively. Thus, the V-phase stator poles 62, 65 have no winding portions forming the V-phase winding 68 shown in FIG. 6.

Figure 7:
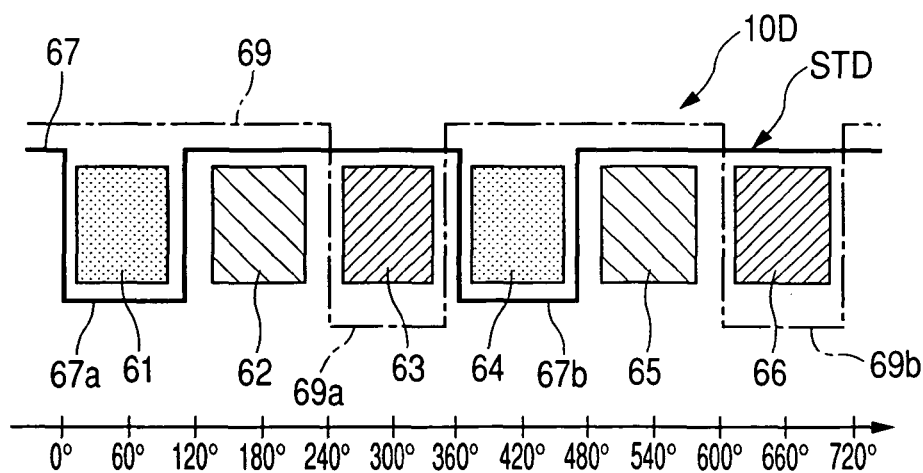
FIG. 7 is a deployment diagram showing a three-phase alternating current motor of a fifth embodiment according to the present invention with a stator deployed in a circumferential direction thereof in terms of electric angles.

With such an winding arrangement of the brushless motor 10D, shown in FIG. 7, wherein the stator winding comprises only the U-phase winding 67 and the W-phase winding 69 with the V-phase winding 68 being removed, the U-phase winding 67 is applied with an alternating excitation current, incorporating a current compensating factor related to a V-phase excitation current related to the V-phase winding being removed, that is, an alternating excitation current lying at a total value of Iu-Iv equal to a sum of a U-phase excitation current Iu and a V-phase excitation current −Iv in negative potential. Likewise, the W-phase winding is applied with an alternating excitation current, incorporating the current factor related to the V-phase excitation current related to the V-phase winding being removed, that is, an alternating excitation current lying at a total value of Iw-Iv equal to a sum of the W-phase excitation current Iw and the V-phase excitation current −Iv in negative potential.

With the U-phase winding and the W-phase winding applied with such alternating excitation current including the current compensating factors related to the omitted phase winding (the V-phase winding), the motor 10D of the present embodiment electromagnetically operates in the same function as that of the three-phase brushless motor shown in FIG. 6.

First Modified Form of Fifth Embodiment

Figure 8:
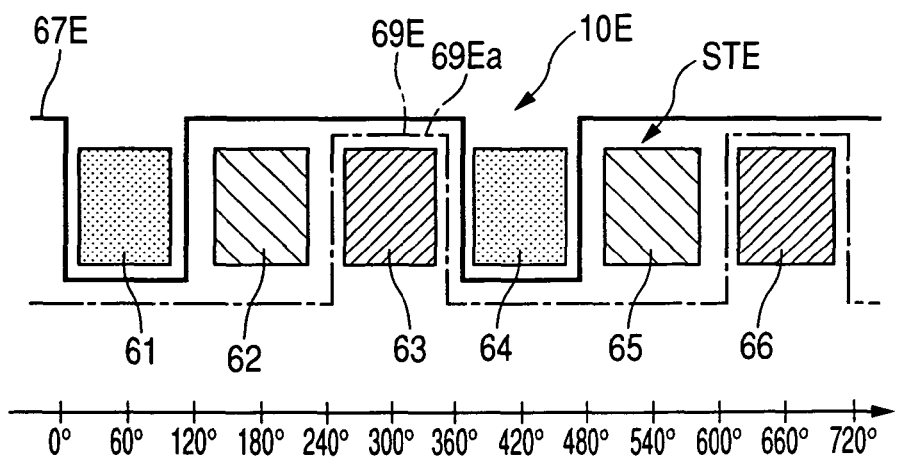
FIG. 8 is a deployment diagram showing a modified form of the three-phase alternating current motor of the fifth embodiment shown in FIG. 7.

FIG. 8 is a deployed diagram showing a first modified form of the brushless motor 10D of the fifth embodiment shown in FIG. 7.

With this modified form, a brushless motor 10E comprises a stator STE including a U-phase winding 67E and a W-phase winding 69E with a V-phase winding being removed. The brushless motor 10E of this modification differs from the brushless motor 10D shown in FIG. 7 in that the W-phase winding 69E has a winding portion 69Ea that is wound on the stator pole 63 in a direction opposite to a direction in which the winding portion 69a of the W-phase winding 69 is wound on the stator pole 63 in FIG. 7.

The stator STE of the brushless motor 10E, shown in FIG. 8, is superior to the structure of the stator STD of the brushless motor 10D, shown in FIG. 7, in that the W-phase winding 69E has no winding intersecting the U-phase winding 67E. Therefore, no interference exists in an axial direction of the rotor at an area between the two windings 67E and 69E, making it possible to provide an ease of assembling the U-phase winding and the W-phase winding.

Figure 9:
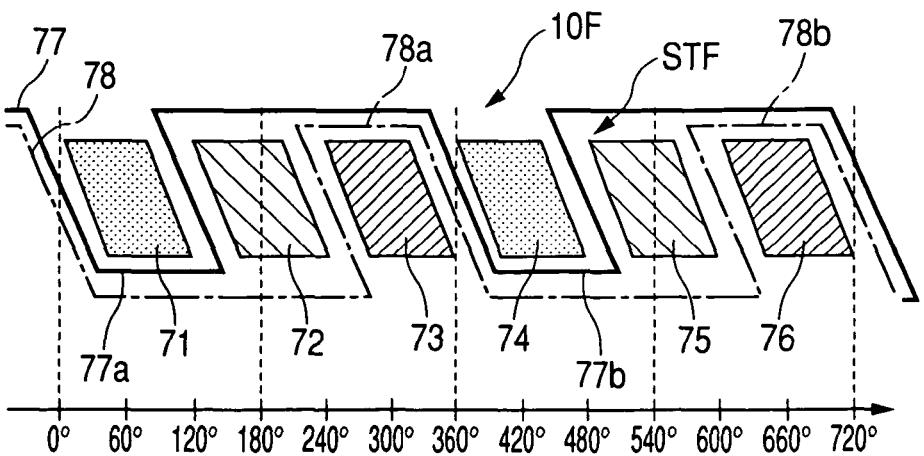
FIG. 9 is a deployment diagram showing another modified form of the three-phase alternating current motor of the fifth embodiment shown in FIG. 7.

FIG. 9 is a deployed diagram showing a second modified form of the brushless motor 10D of the fifth embodiment shown in FIG. 7.

With this modified form, a brushless motor 10F comprises a stator STF including stator poles 71 to 76, which are skewed at given angles, and a stator winding composed of a U-phase winding 77 and a W-phase winding 78 with a V-phase winding being removed. The U-phase winding 77 and the W-phase winding 78 are wound on the stator STF in the same wave winding pattern as that shown in FIG. 8.

More particularly, the U-phase winding 77 has first and second windings 77a, 77b wound on the U-phase stator poles 71, 74, respectively. Likewise, the W-phase winding 78 has first and second windings 78a, 78b wound on the W-phase stator poles 73, 76, respectively.

Figure 10:
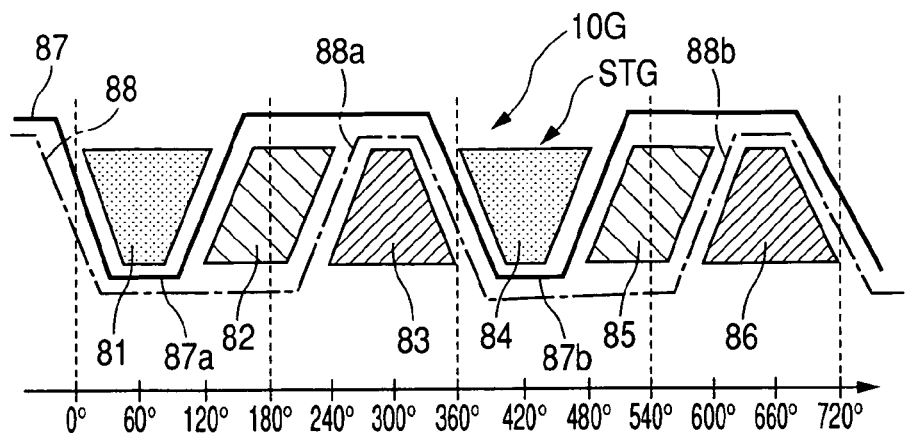
FIG. 10 is a deployment diagram showing still another modified form of the three-phase alternating current motor of the fifth embodiment shown in FIG. 7.

FIG. 10 is a deployed diagram showing a modified form of the brushless motor 10F shown in FIG. 9.

With this modified form, a brushless motor 10G comprises a stator STG including trapezoid-shaped stator poles 81, 83, 84, 86, alternately placed in a circumferential direction of the stator STG, and rhombic shape stator poles 82, 85. The stator STG further comprises a stator winding composed of a U-phase winding 87 and a W-phase winding 88 with a V-phase winding being removed.

With the stator STG of the brushless motor 10G shown in FIG. 10, the U-phase winding 87 has first and second windings 87a, 87b wound on the U-phase trapezoid stator poles 81, 84, respectively. Likewise, the W-phase winding 88 has first and second windings 88a, 88b wound on the W-phase trapezoid stator poles 83, 86, respectively. The rhombic shape stator poles 82, 85 act as V-phase stator poles.

With the brushless motor 10G shown in FIG. 10, the U-phase winding 87 and the W-phase winding 88 have coil end portions bent at obtuse angles in contrast to the stator structures of the motors 10E, 10F shown in FIGS. 8 and 9, respectively. This provides an ease of fabricating the windings with coil end portions being formed in minimized sizes. Thus, the stator winding can be easily fabricated in a miniaturized size at low cost.

Further, the brushless motor 10G has an electromagnetic function to cause the stator to have the same function as that of a stator circumferentially skewed in structure. This results in reduction in ripple torque of the motor, enabling the realization of further smooth operation of the motor. In addition, corners of each stator pole can be formed in smooth shapes in alternative structures.

In addition, the U-phase winding 87 and the W-phase winding 88 have no portions interacting with each other in an axial direction of the rotor, making it possible to easily assemble these two windings in sequence along the axial direction of the rotor without causing any conflict between the associated component parts.

Sixth Embodiment

A three-phase brushless motor of a sixth embodiment according to the present invention is described below with reference to FIG. 11. The three-phase brushless motor 10H of the present embodiment takes the form of a structure including a wave winding structure in combination with a concentrated winding structure.

Figure 11:
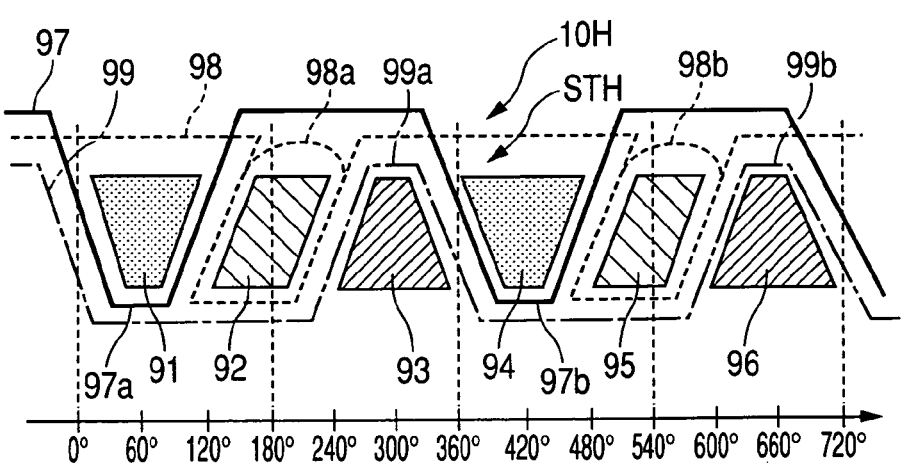
FIG. 11 is a deployment diagram showing a three-phase alternating current motor of a sixth embodiment according to the present invention with a stator deployed in a circumferential direction thereof in terms of electric angles.

More particularly, with the three-phase brushless motor 10H shown in FIG. 11, a stator STH comprises trapezoid-shaped stator poles 91, 93, 94, 96, alternately placed in a circumferential direction of the stator STH, and rhombic shape stator poles 92, 95. The stator STH further comprises a stator winding composed of a U-phase winding 97 and a W-phase winding 98 with a V-phase winding being removed.

With the stator STH of the three-phase brushless motor 10H shown in FIG. 11, the U-phase winding 97 has first and second windings 97a, 97b wound on the U-phase trapezoid stator poles 91, 94, respectively. Likewise, the W-phase winding 99 has first and second windings 99a, 99b wound on the W-phase trapezoid stator poles 93, 96, respectively. The V-phase winding 98 has first and second windings 98a, 98b wound on the rhombic shaped V-phase stator poles 92, 95. With such a stator structure, the U-phase winding 97 and the W-phase winding 99 are wound in wave winding patterns and the V-phase winding 98 is wound in a concentrated winding pattern. Since the U-phase stator poles 91, 94 and the W-phase stator poles 93, 96 have the trapezoid shapes, the U-phase winding 97 and the W-phase winding 99 are wound in the wave winding patterns. In contrast, since the V-phase stator poles 92, 95 are formed in the rhombic shapes, the V-phase winding 98 is wound in the concentrated winding pattern.

Thus, the stator STH of the three-phase brushless motor 10H utilizes the three-phase windings in combination with the wave winding pattern and the concentrated winding pattern of which excellent advantages are utilized. In addition, the three-phase windings have no portions intersecting with each other in an axial direction of the rotor. This results in capability for the three-phase windings to be sequentially assembled to the stator STH along the axial direction of the rotor without causing any interference between the associated component parts.

The brushless motors 10B, 10D, 10E, 10F, 10G shown in FIG. 5 and FIGS. 7 to 10 may be modified in structures described below.

That is, with a modified structure of the brushless motor, a stator may include a first V-phase winding placed adjacent to the U-phase winding and a second V-phase winding placed adjacent to the W-phase winding.

With such a winding structure, the U-phase winding is applied with a U-phase excitation current Iu and the first V-phase winding and the first and second V-phase windings are applied with a V-phase excitation current −Iv in negative potential, while the W-phase winding is applied with a W-phase excitation current Iw. Such a winding structure results in the formation of a three-phase motor with a four-wiring type. Such a three-phase motor with the four-wiring type can have the same electromagnetic action as that of the three-phase motor shown in FIG. 29 or FIG. 6.

Although the three-phase motor mentioned above has an increase in the number of windings, the stator can be formed in a structure with no windings intersecting with each other in the axial direction of the rotor. This provides an advantage of easily assembling the windings in sequence along the axial direction of the rotor without causing any conflict between the associated component parts. In addition, while the three-phase motors with the two-winding type encounter a difficulty in taking a star connection to allow the motors to be driven at high efficiencies with the use of a three-phase inverter, the three-phase motor with the four-winding type can be wired in the star connection to enable the three-phase inverter to drive this motor at a high efficiency.

Now, a method of driving a brushless motor, mentioned above, is described below with reference to FIG. 12.

Figure 12:
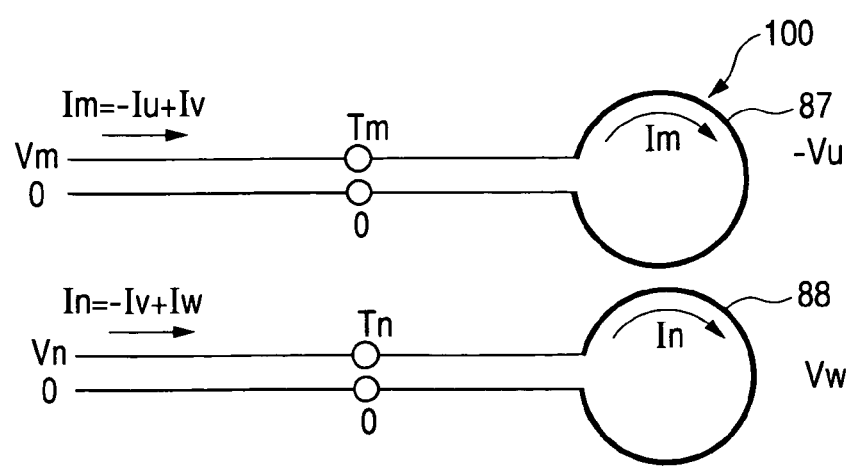
FIG. 12 is a schematic diagram showing one set of windings that are excited with first and second excitation currents upon receipt of first and second excitation voltages, respectively.

FIG. 12 shows a method of driving a brushless motor 100 of a two-winding type.

As shown in FIG. 12, the brushless motor 100 comprises a stator carrying thereon the inverted U-phase winding 87 with an induced voltage −Vu and the W-phase winding 88 with an induced voltage Vw. Although each of the windings 87, 88 is typically shown in a single turn winding, it is to be appreciated that each winding comprises a large number of turns in actual practice.

FIG. 12 shows an exemplary structure of the brushless motor 100 that is driven using one set of single-phase bridge inverters with no particular technical problem being encountered. However, due to a need to independently control excitation currents being applied to the two windings 87, 88, the single-phase bridge inverters need to include eight power semiconductor elements, resulting in a tendency with a control unit formed in a large size.

Next, a method of driving the brushless motor 10G of the two-winding type shown in FIG. 10 using a three-phase inverter is described below with reference to FIGS. 13 to 16.

Figure 13:
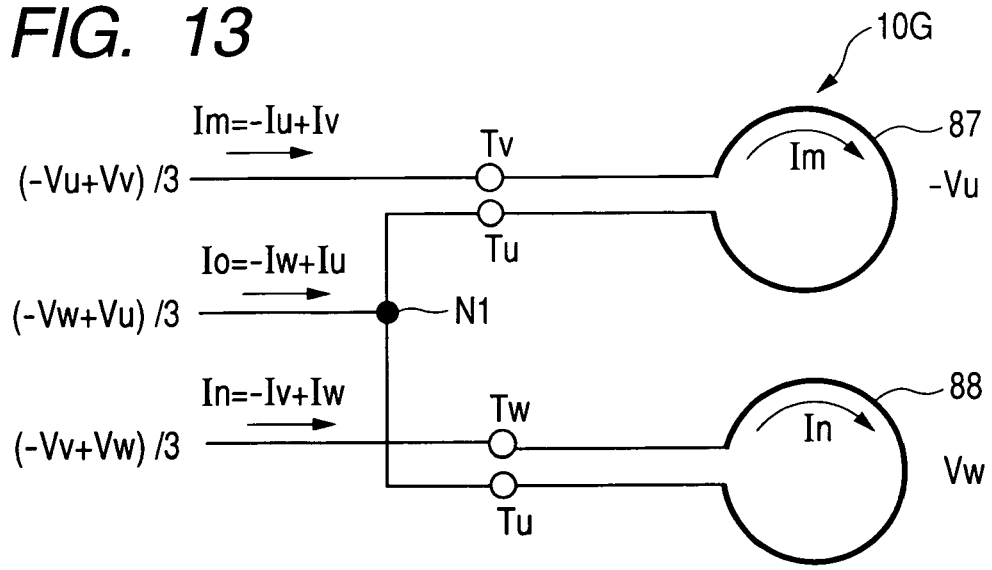
FIG. 13 is a schematic diagram showing a three-phase brushless motor with first and second phase windings to which three-phase alternating voltage is applied.

In FIG. 13, the brushless motor 10G includes the U-phase winding 87 and the W-phase winding 88. The U-phase winding 87 has a leading end connected to a V-phase terminal Tv and a trailing end connected to a U-phase terminal Tu. The W-phase winding 88 has a leading end connected to a W-phase terminal Tw and a trailing end connected to another U-phase terminal Tu, with both the U-phase terminals Tu being connected to each other at a junction point N1.

Figure 14:
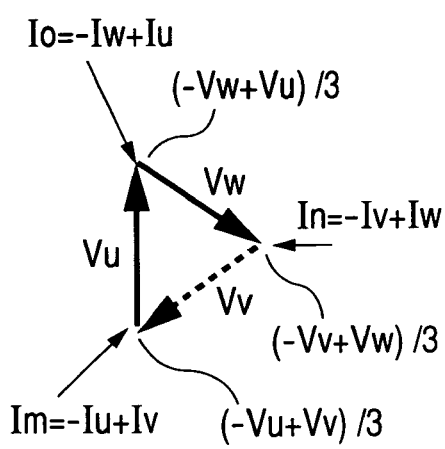
FIG. 14 is a schematic diagram showing the relationship between two-phase currents, flowing through a three-phase brushless motor with first and second phase windings, and a three-phase alternating voltage.
Figure 15:
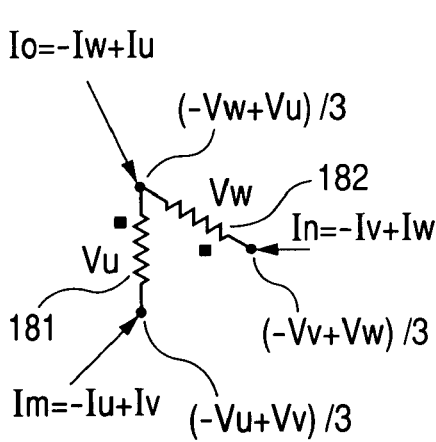
FIG. 15 is a schematic diagram showing the relationship between the two-phase currents, flowing through the three-phase brushless motor with first and second phase windings, and the three-phase alternating voltage.

The connected status, shown in FIG. 13, is shown in a status shown in FIG. 14 in connection with a U-phase excitation voltage Vu, a V-phase excitation voltage Vu and a W-phase excitation voltage Vw. In addition, the connected status between the U-phase winding 87 and the W-phase winding 88 is expressed in a star connection as shown in FIG. 15.

With such an electrical connection mentioned above, suppose that a voltage at a center of the respective terminals Tu, Tv, Tw is zero volt, the voltages appearing at the respective terminals are expressed as $(-Vw+Vu)/3$, $(-Vu+Vv)/3$ and $(-Vv+Vw)/3$. When this takes place, input excitation currents flow through the respective terminals Tu, Tv, Tw at respective values expressed as $Io=-Iw+Iu$, $Im=-Iu+Iv$ and $In=-Iv+Iw$.

Thus, the three-phase motor incorporating the stator provided with the two windings can be driven under the same electromagnetic action as the three-phase motor of the three-winding type of the related art. In addition, the method of realizing the electromagnetic action of the three-phase windings through the use of the two windings can be realized in a complementary relationship with three U-, V- and W-phases with an action of the V-phase being compensated with the U- and W-phases.

Figure 16:
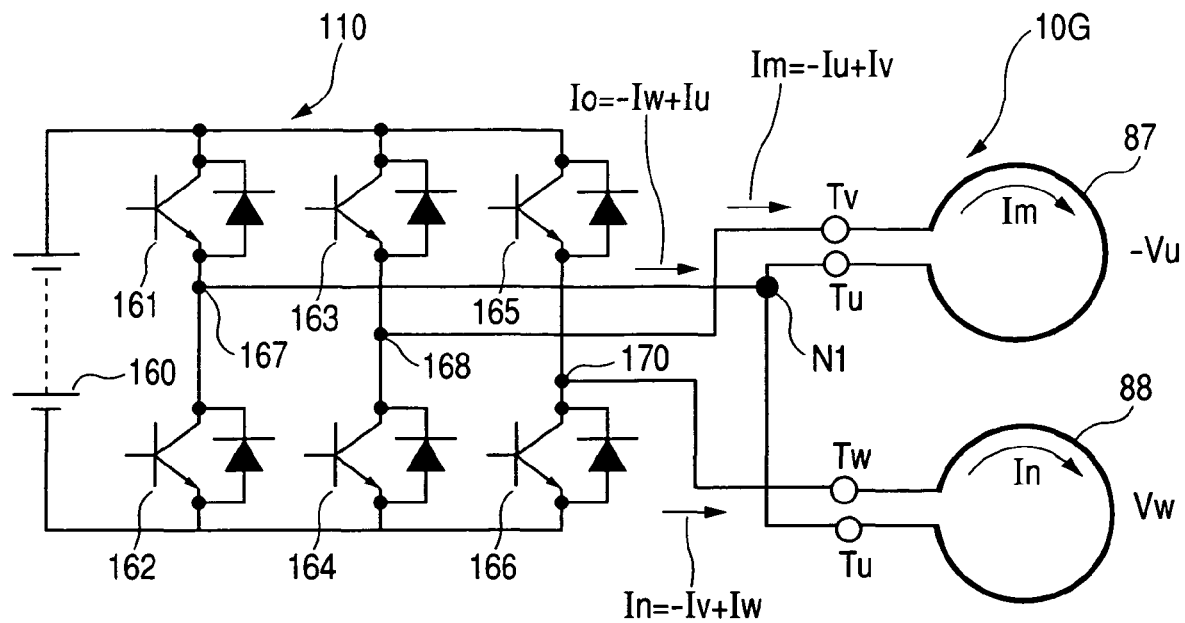
FIG. 16 is a circuit diagram of a three-phase inverter serving as a control device for the three-phase alternating current motor with the two windings shown in FIG. 13.

FIG. 16 shows an exemplary connecting status between the brushless three-phase motor 10G implementing the present invention and a general-purpose type three-phase inverter 110. More particularly, the three-phase inverter 110 comprises a DC power source 160 composed of batteries or a rectifying circuit connected to a three-phase AC power supply for rectifying AC power output to generate DC power output, a first pair of switching power semiconductor elements 161, 162, a second pair of switching power semiconductor elements 163, 164 and a third pair of switching power semiconductor elements 165, 166. Each of the switching power semiconductor elements is associated with a reverse flow diode.

The first pair of switching power semiconductor elements 161, 162 are connected to a first output 167 that is connected to the neutral terminal N1 to apply a first excitation current of $Io=-Iw+Iu$ to the U-phase and W-phase windings 87, 88 through the terminals Tu. Likewise, the second pair of switching power semiconductor elements 163, 164 are connected to a second output 168 to apply a second excitation current of $Im=-Iu+Iv$ to the U-phase winding 87 through the terminals Tv. Similarly, the third pair of switching power semiconductor elements 165, 166 are connected to a third output 170 to apply a third excitation current of $In=-Iv+Iw$ to the W-phase winding 88 through the terminals Tw.

Thus, the U-phase and W-phase windings 87, 88 can be driven with the three-phase inverter 110 to cause the brushless motor 10G to smoothly rotate under the same electromagnetic action as that of the related art three-phase brushless motor.

While the motor driving method of the present invention has been described with reference to the three-phase brushless motor 10G shown in FIG. 10, the brushless motors, shown in FIGS. 1 to 5 and FIGS. 7 and 8, can be driven using the generous-purpose type three-phase inverter.

Next, with the three-phase brushless motors of the two-winding type, the first V-phase winding can be placed in parallel to the U-phase winding and the second V-phase winding can be placed in parallel to the W-phase winding to provide a motor with a sum of four windings in a manner as set forth above. Such split V-phase windings can be merely placed in parallel to the relevant windings of the brushless motor of the two-winding type, respectively.

Figure 17:
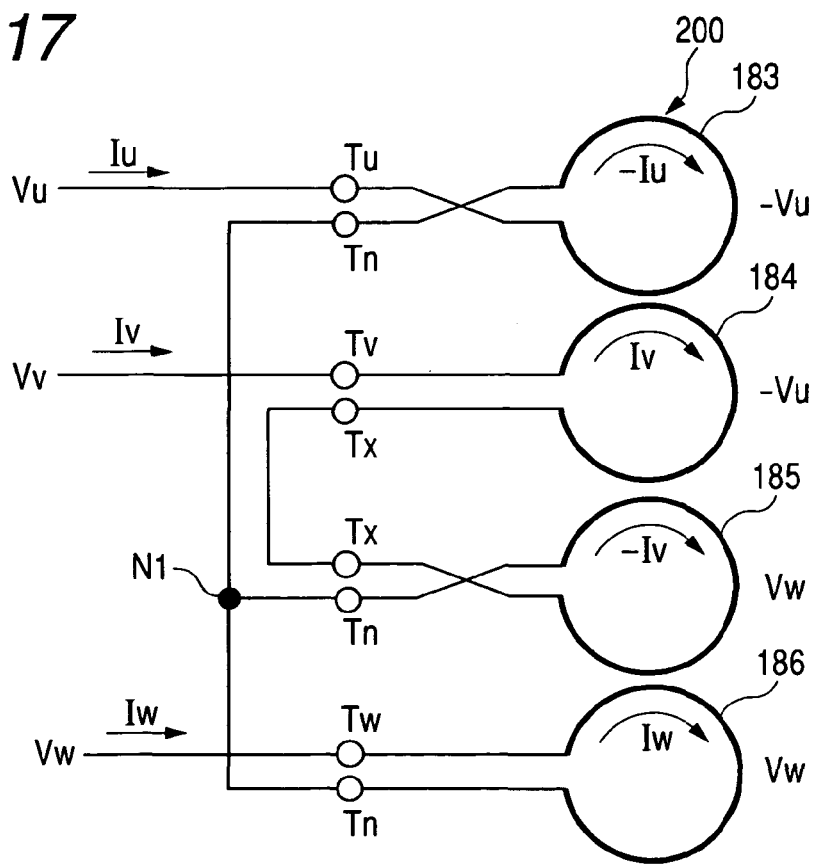
FIG. 17 is a schematic view showing a three-phase alternating current motor with four windings excited with two-phase currents in response to a three-phase alternating voltage.

FIG. 17 is a schematic diagram showing a brushless motor including a stator incorporating four windings available to be applied with excitation currents.

With the brushless motor 200 shown in FIG. 17, a stator includes first to four windings 183 to 186. The first winding 183, acting as a U-phase winding, has a leading end connected to a terminal Tn and a trailing end connected to a terminal Tu. Likewise, a first V-phase phase winding 184 has a leading end connected to a terminal Tv and a trailing end connected to a terminal Tx. In addition, a second V-phase winding 185 has a leading end connected to a terminal Tn and a trailing end connected to a terminal Tx. Likewise, the W-phase winding 186 has a leading end connected to a terminal Tw and a trailing end connected to a terminal Tn. The terminals Tx of the first and second V-phase windings 184, 185 are connected together. In addition, the terminals Tn of the U-phase winding 183, the first and second V-phase windings 184, 185 and the W-phase windings 186 are connected at a neutral point N1.

With such a stator with the first and second split. V-phase windings connected to the U-phase winding and the W-phase winding via the neutral point as mentioned above, a U-phase excitation voltage Vu is applied through the U-phase terminal Tu to the U-phase winding 183 to cause a U-phase excitation current $-Iu$ to flow therethrough. In addition, a V-phase excitation voltage Vv is applied through the V-phase terminal Tv to the first and second V-phase windings 184, 185 to cause first and second V-phase excitation currents Iv, $-Iv$ to flow through the first and second V-phase windings 184, 185, respectively. Likewise, a W-phase excitation voltage Vw is applied through the terminal Tw to the W-phase winding 186 to cause a W-phase excitation current Iw to flow therethrough.

Thus, the first and second V-phase excitation currents Iv, $-Iv$ flow through the first and second V-phase windings 184, 185, respectively in series and a voltage appearing across these two V-phase windings 184, 185 takes the relationship expressed as $-Vu -Vw=Vu$. This results in consequence with the excitation currents Iu, Iv, Iw flowing through the respective windings for the phase voltages Vu, Vv, Vw. Also, with the brushless motor 200 shown in FIG. 17, the stator includes the U-phase winding, the two V-phase windings and the W-phase winding connected in a star connection. In an alternative, these windings may be connected in a delta connection.

Seventh Embodiment

A two-phase brushless motor with four poles of a seventh embodiment according to the present invention is described below with reference to FIGS. 18 and 19.

Figure 18:
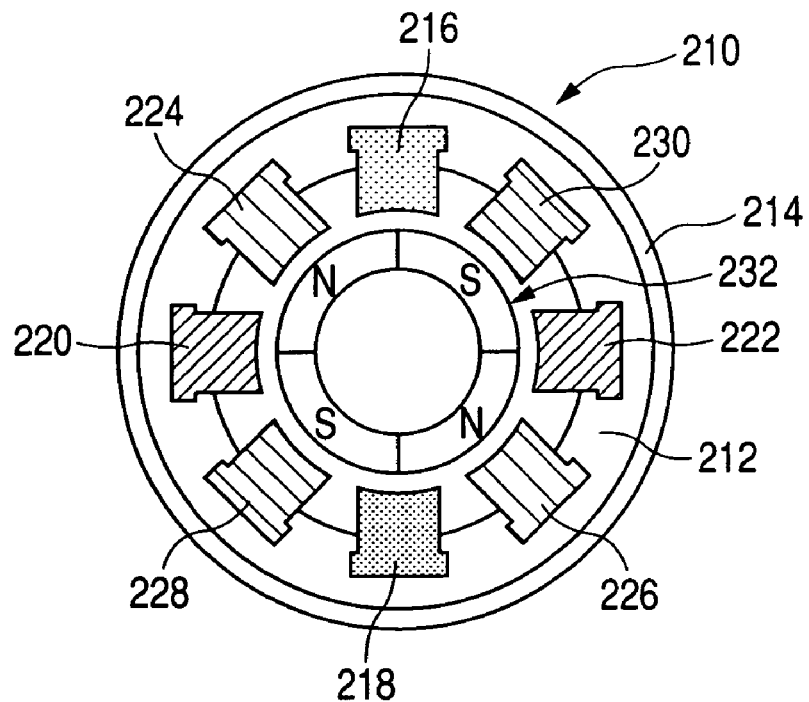
FIG. 18 is a schematic cross sectional view showing a two-phase motor with four stator poles of a seventh embodiment according to the present invention.

As shown in FIG. 18, the two-phase brushless motor 210 of the present embodiment comprises a stator core 212, disposed inside a motor housing 214, which has A-phase stator poles 216, 218, inverted A-phase stator poles 220, 222, B-phase stator poles 224, 226 and inverted B-phase stator poles 228, 230. The two-phase brushless motor 210 further comprises a rotor 232 rotatably supported inside the stator core 212 and having a permanent magnet magnetized in S-poles and N-poles alternately positioned on an outer circumference of the rotor 232.

Figure 19:
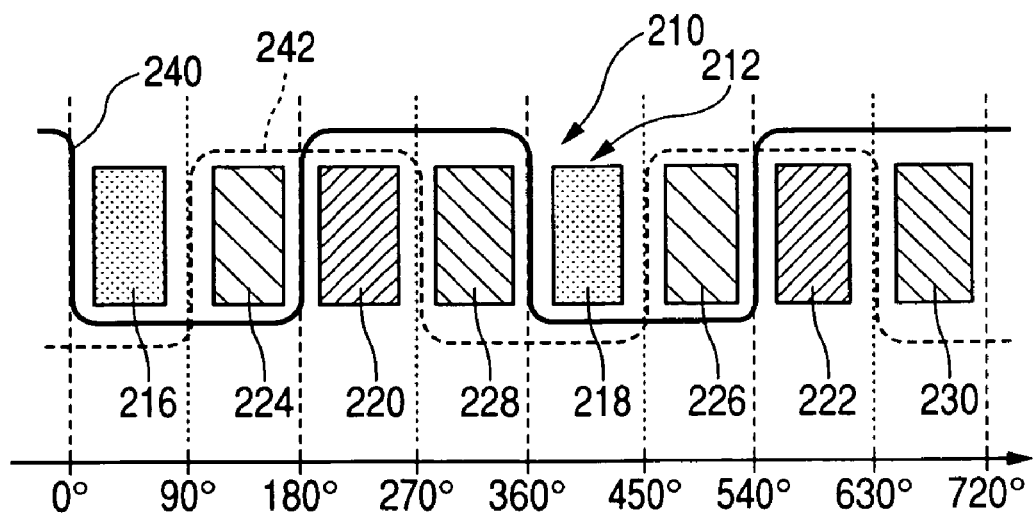
FIG. 19 is a deployment diagram showing the two-phase motor, shown in FIG. 18, with a stator deployed in a circumferential direction thereof in terms of electric angles.

FIG. 19 is a deployment diagram showing shapes of the stator poles 216 to 230 of the stator core 212, as viewed from a rotor side at an inner peripheral side of the stator poles 216 to 230 of the stator core 212, and a stator winding wound on the stator core 212 in a wave winding pattern with a circumferential rotating angle being plotted on the abscissa in terms of electric angles from 0° to 720°.

As shown in FIG. 19, the stator winding comprise an A-phase winding 240 and a B-phase winding 242 that are wound on the associated stator poles in the respective wave winding patterns. The stator poles 216 to 230 have rectangular shapes in a structure shown in FIG. 19 but may be altered in shape to have trapezoid shapes and rhombic (parallelogram) shapes as shown in FIG. 20C.

With such a structure, the respective windings can be wound on the stator core 212 at small bending angles, providing an ease of fabricating the windings with a reduction in cost. In addition, the two-phase brushless motor can have an electromagnetic action with an effect in which the stator core is skewed in a circumferential direction. This results in reduction in torque ripple, enabling the realization of smooth operation of the motor.

Figure 20A:
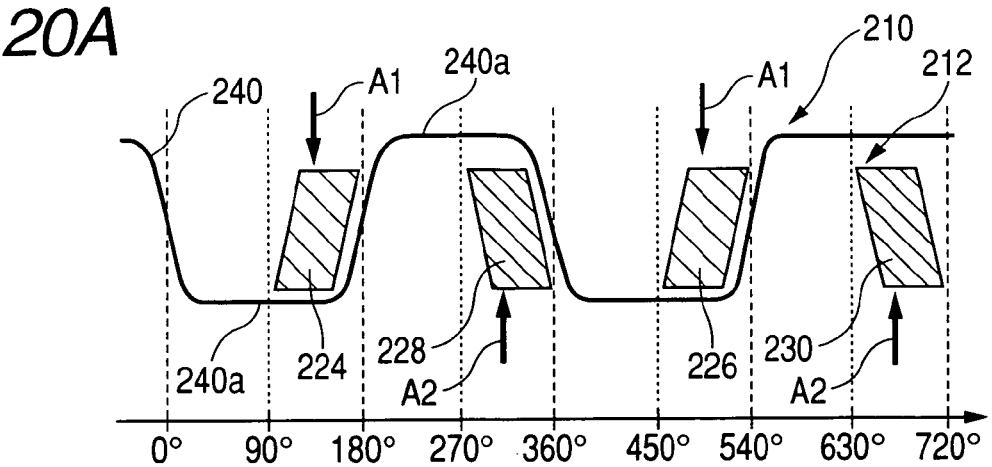
FIGS. 20A to 20C are schematic winding diagrams showing a basic sequence of assembling first and second windings and stator poles of the two-phase motor shown in FIG. 19.
Figure 20B:
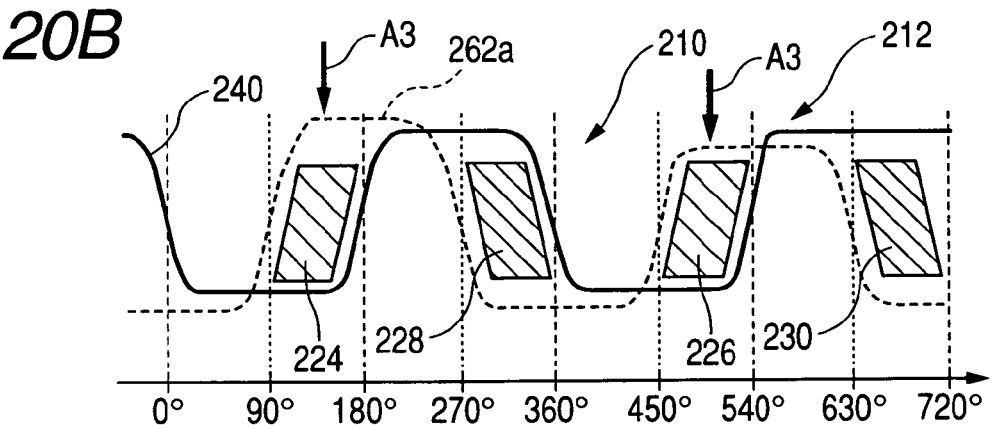
Figure 20C:
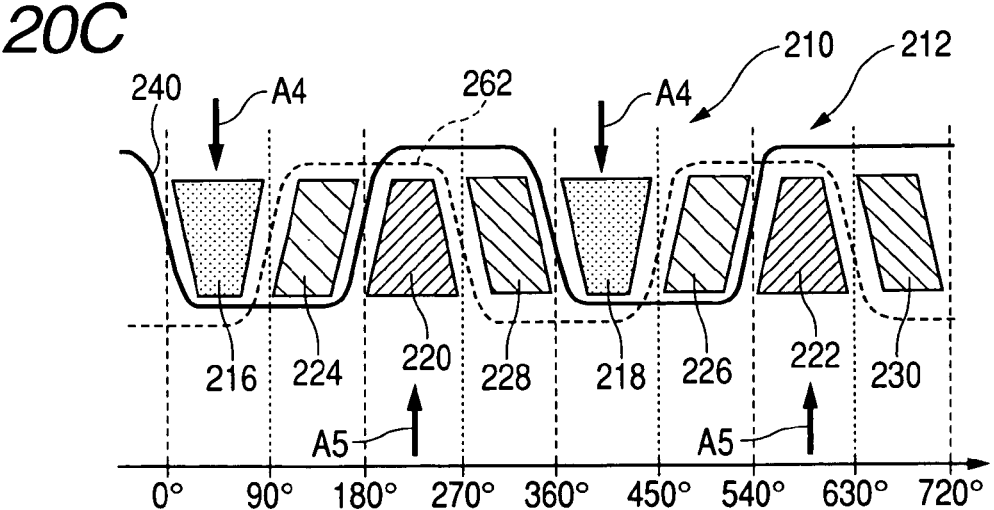

FIGS. 20A and 20B are schematic views for illustrating a basic sequence of steps of assembling the two-phase brushless motor 210 shown in FIGS. 18 and 19. It will be appreciated that the stator poles 216 to 230, formed in rectangular shapes in FIG. 19, are shown in FIGS. 20A to 20C in modified shapes.

In assembling the two-phase motor 210, initially, the first phase winding 240 is wound on the stator poles 224, 226 of the stator core 212 in a first wave winding pattern as shown in FIG. 20A. During such winding operation, the first phase winding 240 is shaped to have a coil end portion 240a with a bent portion radially bent outward, that is, toward an outer circumferential periphery of the motor 210 so as to prevent the coil end portion 240a from interfering with a relevant coil end portion 262a of the second phase winding 262.

Then, in next step, the B-phase stator poles 224, 226 are assembled to the stator core 212 in directions indicated by arrows A1, A1 as shown in FIG. 20A. Subsequently, the inverted B-phase stator poles 228, 230 are assembled to the stator core 212 in directions indicated by arrows A2, A2 as shown in FIG. 20A.

In next step shown in FIG. 20B, the second phase winding 262 is assembled in directions as indicated by arrows A3, A3. During such assembling step, although the first and second phase windings 240, 262 interfere with each other, the second phase winding 262 can be easily assembled to the stator core 212 utilizing a vacant space present in a surrounding area while making the second phase winding 262 to be flexible to some extent for enabling assembly of the second phase winding 262.

More particularly, the second phase winding 262 is altered in configuration to be shaped in a reduced diameter and inserted to an interior of the stator core 212, after which the diameter of the second phase winding 262 is returned to an original size for assembly to the stator core 2212.

Thereafter, the A-phase stator poles 216, 228 are assembled to the stator core 212 in directions as shown by arrows A4, A4 in FIG. 20C, while assembling the inverted A-phase stator poles 220, 222 to the stator core 212 in directions as shown by arrows A5, A5.

Thus, the A-phase stator poles and the B-phase stator poles and the associated A-phase winding 240 and the B-phase winding 262 can be assembled to the stator core 212 in a relatively easy fashion at low cost thereby manufacturing the two-phase brushless motor 210.

Further, the brushless motor implementing the present invention can be formed in a multi-pole structure with a tendency of realizing the miniaturization with high torque output. With the brushless motor formed in the multi-pole structure, the stator core can have narrowed winding bundles for each phase and have an increased number of bent portions with the resultant decrease I rigidity of the winding bundles. This results in an ease of deforming structures of the winding bundles such that these winding bundles have reduced diameters during step of assembling the brushless motor.

Figure 21:
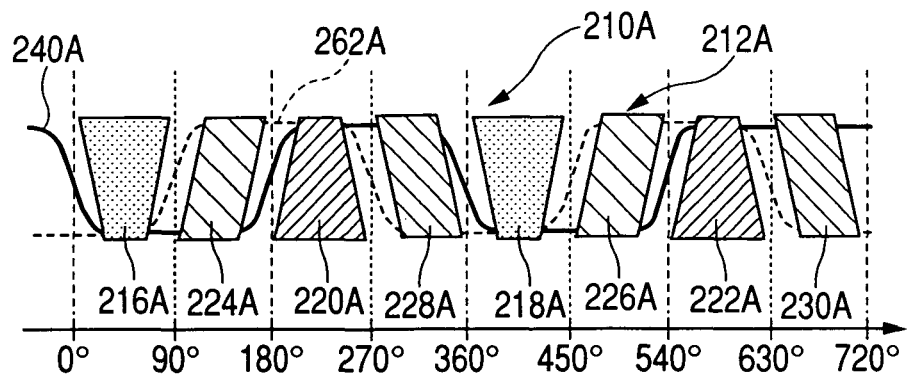
FIG. 21 is a schematic winding diagram showing a modified form of the two-phase motor shown in FIG. 20C.

FIG. 21 shows a modified form of the two-phase brushless motor 210 shown in FIGS. 20A to 20C.

As shown in FIG. 21, a stator core 212A of a brushless motor 210A comprises stator poles 216A to 230A. That is, the stator core 212A comprises the trapezoid stator poles 216A, 220A, 218A, 222A and the rhombic stator poles 224A, 228A, 226A, 230A. The stator poles 216A to 230A are formed with axially facing indent portions that accommodate coil end portions of an A-phase winding 240A and a B-phase winding 262A. With such a structure, axial protruding lengths of the A-phase winding 240A and the B-phase winding 262A, axially extending from associated axial end faces of the stator core 212A, can be minimized in structure. This results in reduction in an axial length of the motor.

Now, a method of manufacturing a motor, involving a method of fabricating component parts of the motor in particular shape and a method of assembling the components parts of the motor according to the present invention, is described below with reference to FIG. 10 and FIGS. 22 to 25.

In a case where the brushless motor 10G has the stator structure shown in FIG. 10, it can be easily appreciated that the stator poles are assembled relative to each other along an axial direction of the rotor without causing any interference between the associated component parts.

More particularly, for an exemplary concrete motor manufacturing method, the V-phase stator poles 82, 85 are disposed in fixed positions and the first (U-phase) winding 87 is assembled to the stator poles 82, 85 on one axial end face of the stator core STG, that is, from an upper area of the stator core STG in FIG. 10. Thereafter, the U-phase stator poles 81, 84 are assembled to the stator core STG on the one axial end face thereof. Thereafter, the second phase (W-phase) winding 88 is assembled to the stator core STG on the other axial end face thereof and the stator poles 83, 86 are assembled to the stator core STG on the other axial end face of the stator core STG.

The related art brushless motors, shown in FIG. 29 and FIGS. 31 to 33, encounter difficulties in simply assembling the various stator poles and the associated windings to the stator cores because of the presence of the windings that intersect with each other in axial direction of the rotor. On the contrary, with the brushless motor 10G of the embodiment shown in FIG. 10, the associated windings have no intersecting parts. Thus, the brushless motor 10G can be easily manufactured without causing any conflict between the associated component parts.

Figure 22:
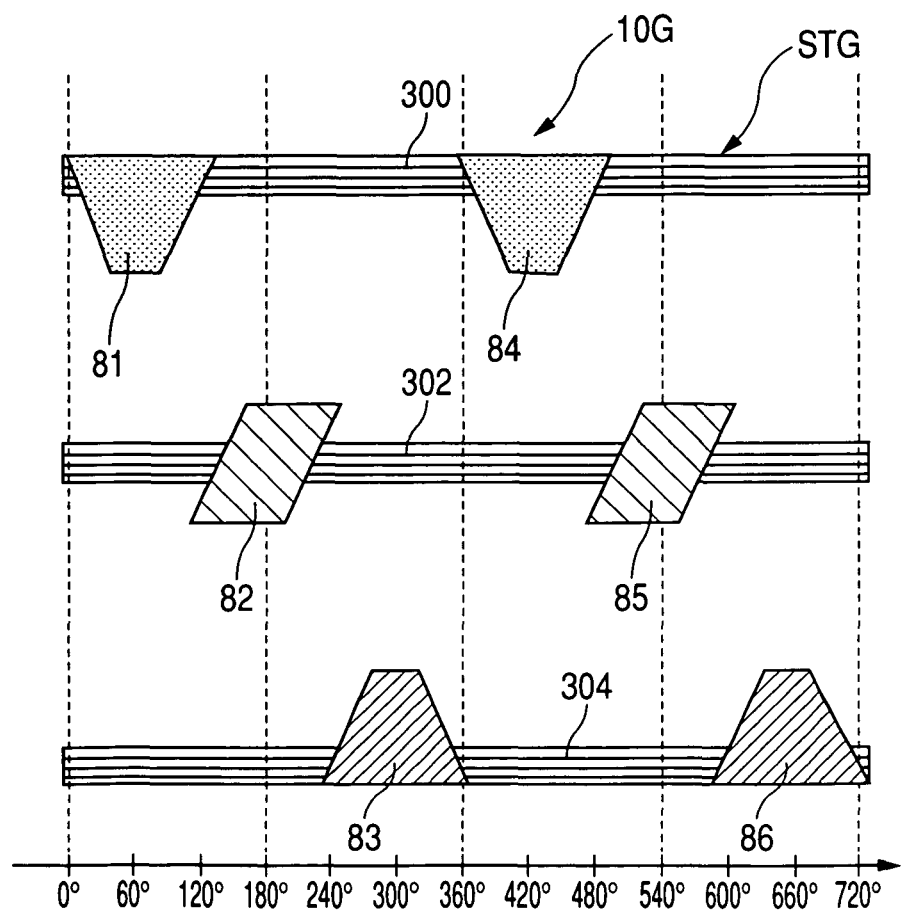
FIG. 22 is an exploded schematic view showing a stator core formed in plural stator core elements each formed with stator poles.

FIG. 22 shows an exemplary concrete structure of the stator core STG forming the brushless motor 10G shown in FIG. 10.

As shown in FIG. 22, the stator core STG includes first, second third split stator core elements 300, 302, 304. The first stator core element 300 serves as a part of a back yoke and has the trapezoid stator poles 81, 82 formed on first circumferentially spaced positions spaced from each other by an electrical angle of 360°. The trapezoid stator poles 81, 82 act as the U-phase stator poles.

The second stator core element 302 serves as a part of another back yoke and has the rhombic stator poles 82, 85 formed on second circumferentially spaced positions, spaced from each other by the electrical angle of 360°, each of which is distanced from each of the trapezoid stator poles 81, 84 by an electrical angle of 120°. The rhombic stator poles 82, 85 act as the V-phase stator poles.

Likewise, the third stator core element 302 serves as a part of another back yoke and has the trapezoid stator poles 83, 86 formed on third circumferentially spaced positions, spaced from each other by the electrical angle of 360°, each of which is distanced from each of the rhombic stator poles 82, 85 by an electrical angle of 120°. The trapezoid stator poles 83, 86 act as the W-phase stator poles.

With the stator core STG formed in such a structure, the first, second and third stator core elements 300, 302, 304 are assembled together while placing the windings 87, 88 in respective positions as mentioned above. This allows the U-phase stator poles 82, the V-phase stator poles 82, 85 and the W-phase stator poles 83, 86 to be located in respective positions as shown in FIG. 10.

Figure 23A:
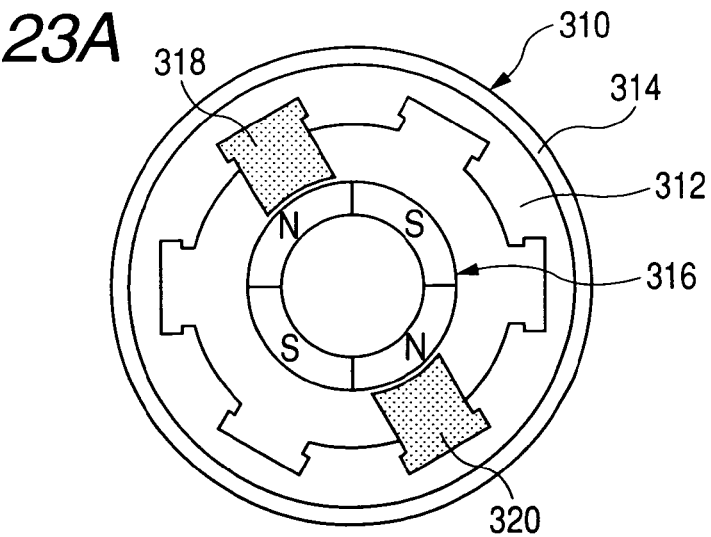
FIGS. 23A to 23C are schematic views showing a basic sequence of assembling stator core elements.
Figure 23B:
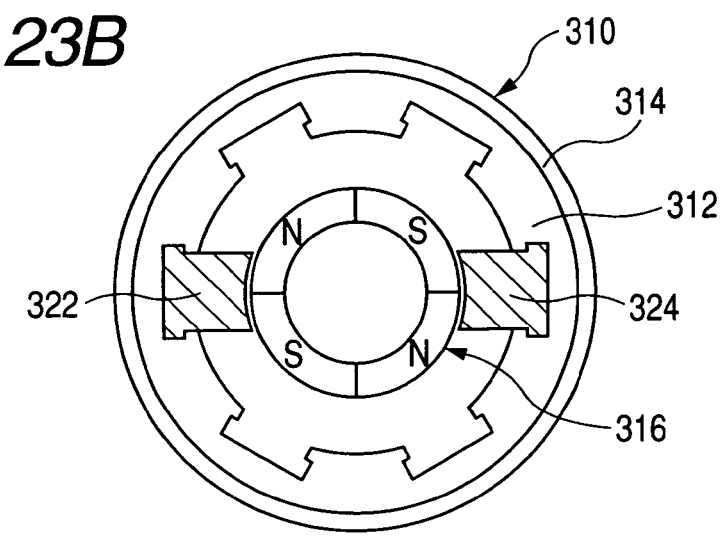
Figure 23C:
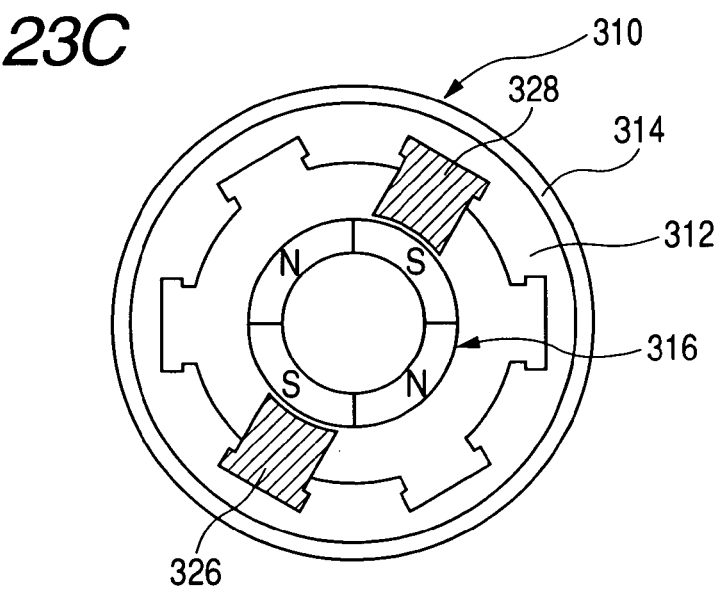

FIGS. 23A to 23C show a modified form of the brushless motor in the form of a structure with a back yoke section and stator poles being separately formed from each other and combined to each other during assembling step.

As shown in FIGS. 23A to 23C, the brushless motor 310 comprises the back yoke section 312, acting as a stator core and covered with a motor housing 314, and a rotor 316, having permanent magnet magnetized in N-poles and S-poles, which is rotatably disposed inside the stator core 312. The stator core 312 carries U-phase stator poles 318, 320, V-phase stator poles 322, 324 and W-phase stator poles 326, 328.

Figure 24:
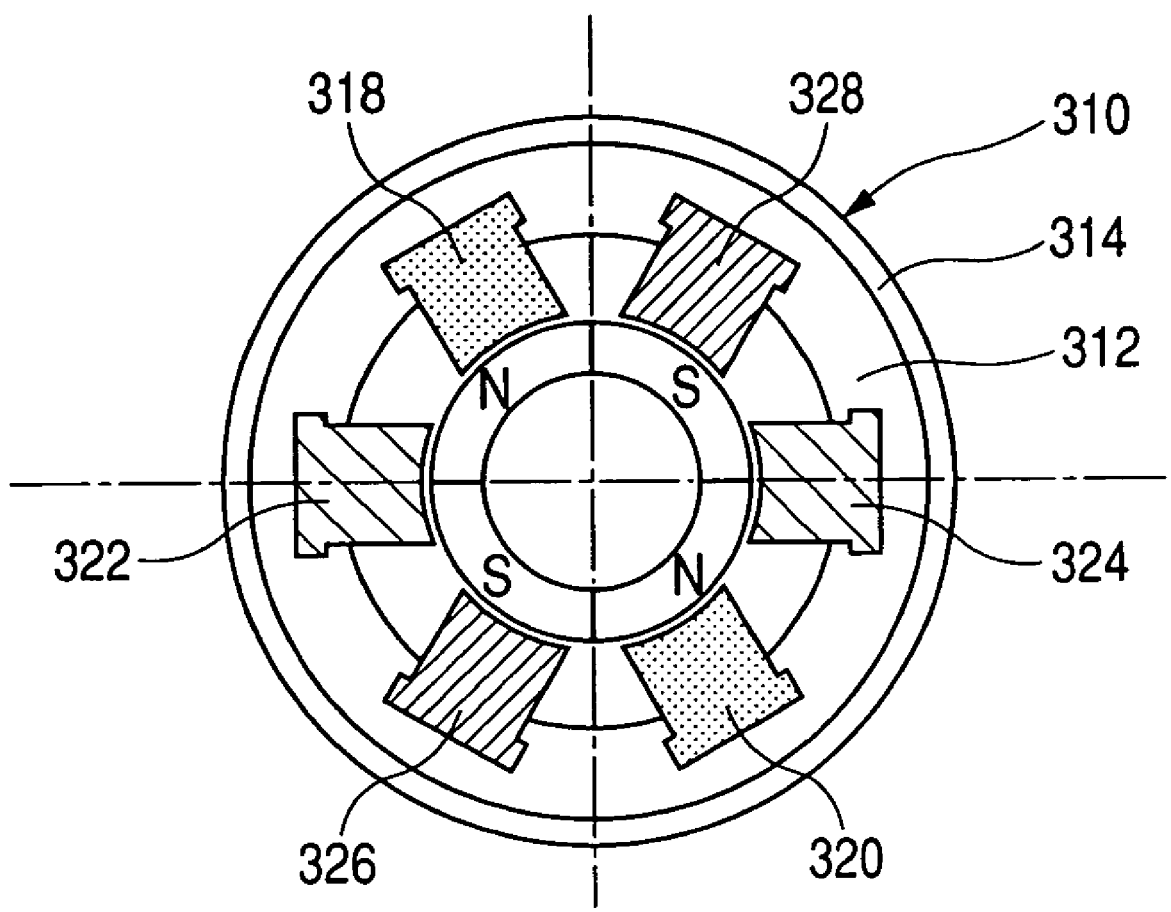
FIG. 24 is a schematic cross sectional view showing a stator core in an assembled state.

The U-phase stator poles 318, 320, the V-phase stator poles 322, 324 and the W-phase stator poles 326, 328 are assembled to the back yoke section 312 in the same assembling sequence as that mentioned above as shown in FIGS. 23A to 23C into the brushless motor 310 in an assembled structure shown in FIG. 24. Also, it is to be appreciated that the stator poles 318 to 328 are shown in FIGS. 23A to 23C in simplified shapes, respectively, for the sake of simplicity of illustration.

Even with the brushless motors shown in FIGS. 1 to 3, 4 and 7 to 9, since the stator core includes two windings, these windings may be altered in respective winding configurations with less interference between associated component parts upon taking relatively easy expedient measures such as compelling coil end portions of the respective windings to be separately placed in radially outward positions and radially inward positions, respectively.

Especially in a case where the windings are wound in external areas outside the stator core and shaped to fabricate respective winding coils, a fabrication time needed for winding the soils can be shortened with an advantageous effect of achieving an increased occupancy of the windings. Thus, the brushless motor can be manufactured in high efficiency in a minimized size at low cost.

Figure 32:
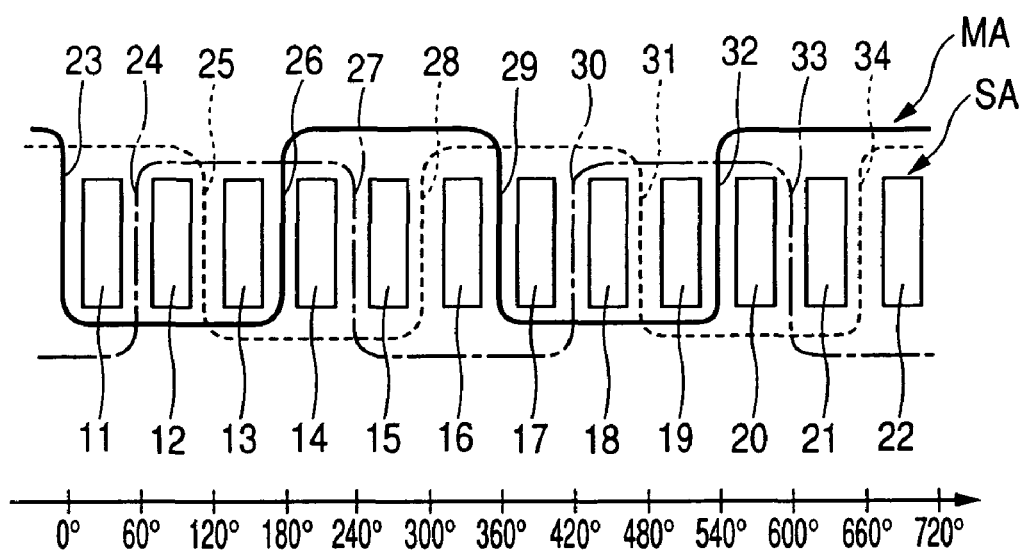
FIG. 32 is a deployment view of a stator showing the relationship between stator poles and windings of another motor of the related art.
Figure 33:
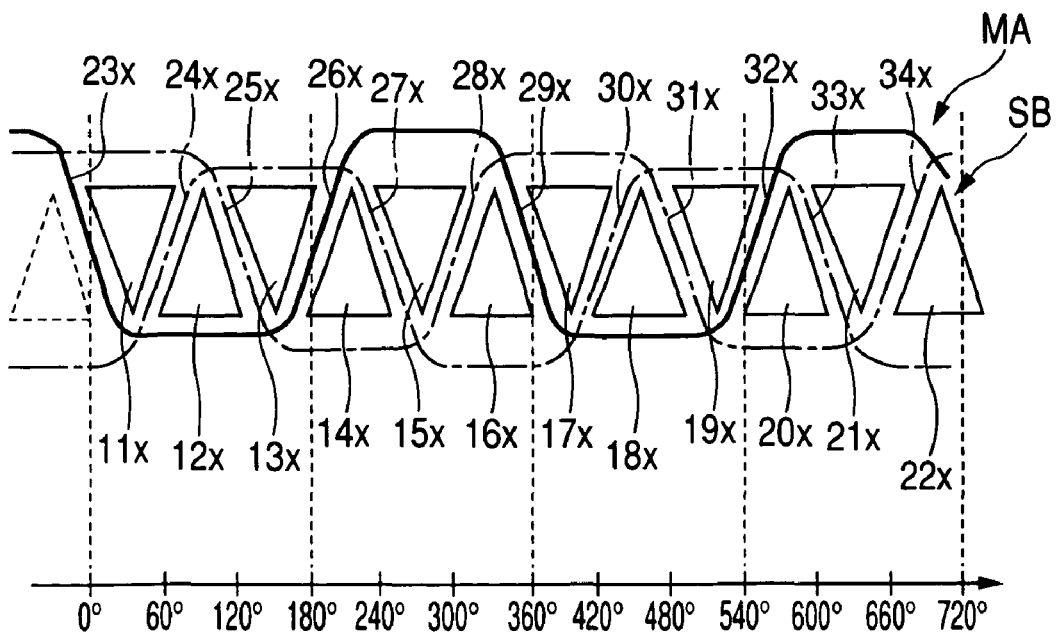
FIG. 33 is a deployment view of a stator showing the relationship between stator poles and windings of still another motor of the related art.

In addition, with the brushless motors of the related art shown in FIGS. 31 to 33, the stator core include three sets of windings that are liable to suffer interfere with each other with a difficulty encountered in fixing winding configurations prior to assembling step.

In normal practice, there are many probabilities wherein winding bundles are fabricated and inserted to respective slots of the stator core in a so-called inserter method or windings are wound on the stator core in a manually inserting method.

Figure 28:
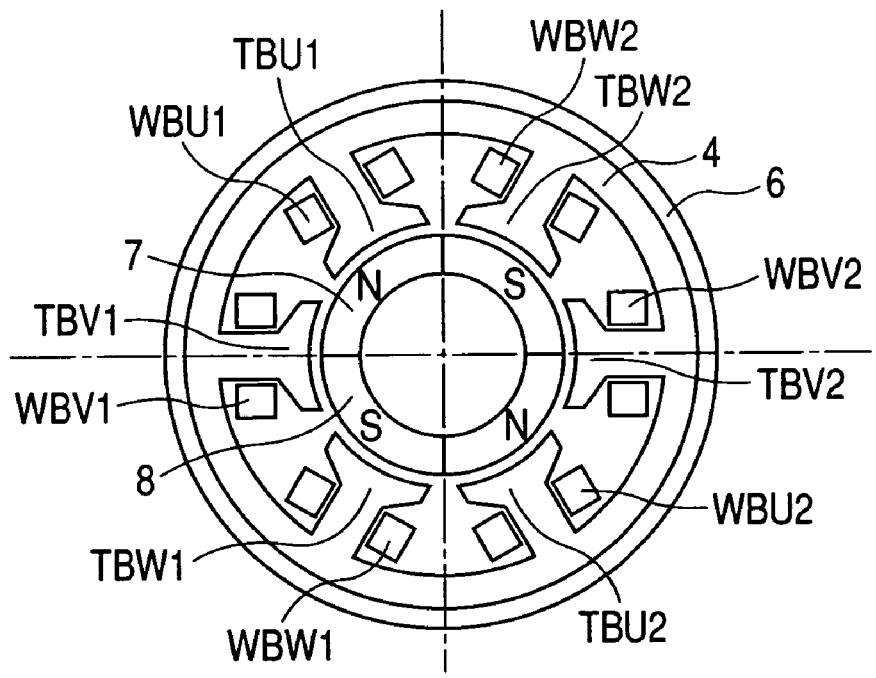
FIG. 28 is a cross sectional view showing a schematic structure of the related art brushless motor shown in FIG. 27.

In case of the related art brushless motors of the concentrated winding type shown in FIGS. 28 and 29, the windings are often directly wound on the stator core. In such a case, the stator core needs to have adequate spaces available to a guide needle to pass for winding the winding. This results in a need for a vacant space to be prepared between winding coils with the resultant issue with a reduction in space-utilization ratios.

Further, in another manufacturing method, the stator core is split into a plurality of stator core elements and respective windings are wound on each split stator core element, after which the split stator core elements carrying the respective windings are assembled together. In such a manufacturing method, the windings can be wound in high efficiency with an interior of the split stator core element having improved space-utilization ratios but adverse affect is encountered in respect of assembling cost and rigidity of the stator core.

Figure 25:
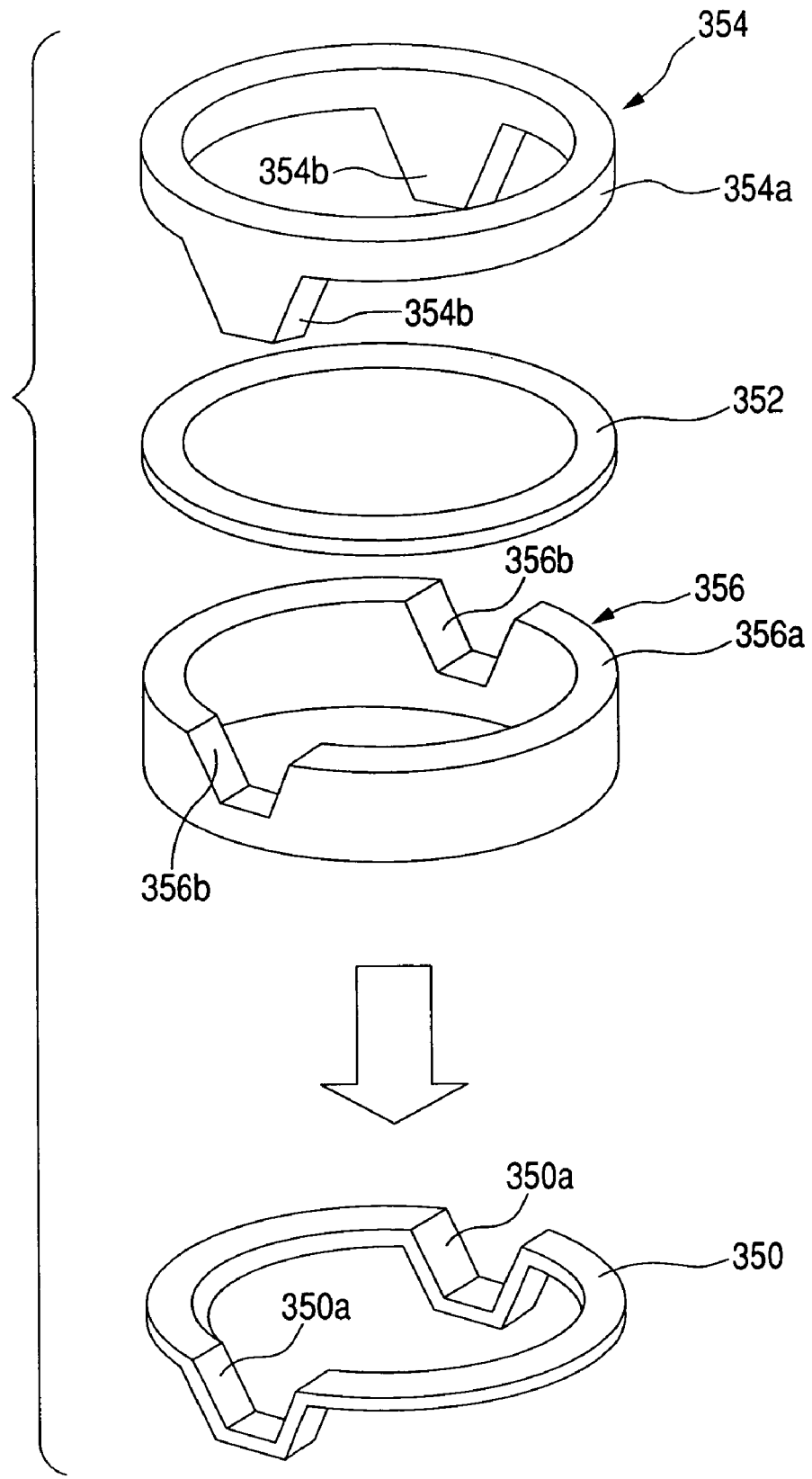
FIG. 25 is an exploded perspective view showing a step of forming a winding.

FIG. 25 is an exploded view illustrating a method of fabricating a shaped coil 350 upon molding an annular coil 352 with the use of upper and lower molding dies 354, 356.

The upper and lower molding dies 354, 356 are made of materials such as, for instance, wood, plastic or metal. The upper molding die 354 comprises an annular die body 354 having a pair of axially extending trapezoid protrusions 354b, 354b formed at given circumferentially spaced positions. The lower molding die 356 comprises an annular die body 356 having an upper wall formed with a pair of trapezoid shape recessed portions 356b, 356b formed at positions in axial alignment with the trapezoid protrusions 354b, 354b of the upper molding die 354.

In fabricating the molded coil 350, a winding is wound in an annular coil to form the annular coil 352 as shown in FIG. 25. Then, the annular coil 352 is placed between the upper and lower molding dies 354, 356, upon which the upper and lower molding dies 354, 356 are pressed against each other thereby press forming the molded coil 350 with a pair of coil portions 300a, 350b in high efficiency with an increased space-occupation rate. The molded coil 350, obtained in such a fabricating method, can be used as the windings for the brushless motor 10G shown in FIG. 10.

With the stator core structure of the brushless motor shown in FIGS. 24A to 24C, the A-phase winding 240 needs to be formed in a configuration not to interfere with the B-phase winding 262. The B-phase winding 262 needs to be formed in a coil that is totally flexible to make it possible to bend a whole structure to some extent or a portion of the coil needs to take a flexible structure.

Further, the stator core forming the brushless motor of the present invention may be split into the structures shown in FIGS. 18 and 24. In another alternative, another brushless motor may comprises a stator core split into a structure as shown in FIG. 26.

Figure 26:
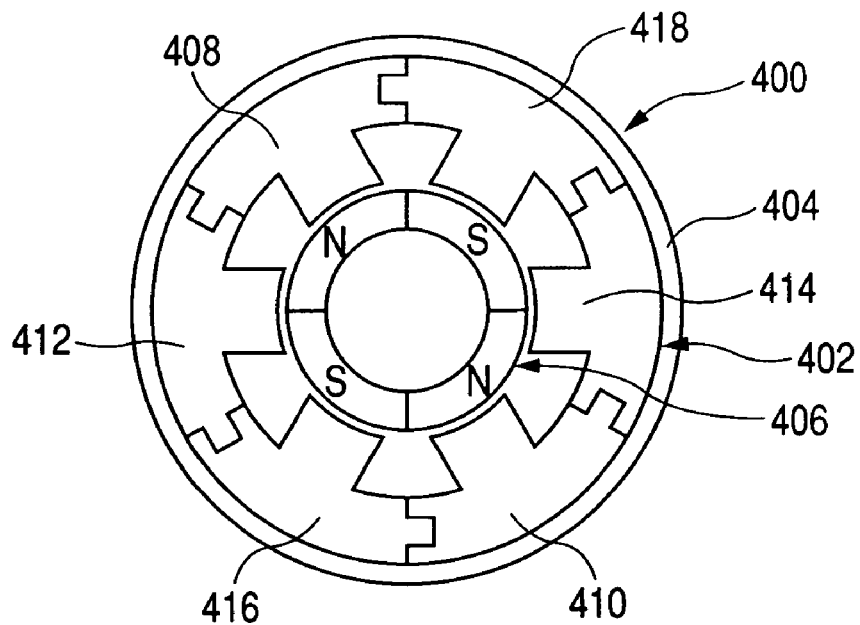
FIG. 26 is a schematic view showing a split type stator core forming a modified form of the brushless motor shown in FIGS. 23A to 23C.

With such a structure of the brushless motor shown in FIG. 26, the brushless motor 400 comprises the stator core 402, disposed inside a cover 404, which includes split stator core elements. These split stator core elements include U-phase stator pole segments 408, 410, V-phase stator pole segments 412, 414, and W-phase stator pole segments 416, 418. The two-phase brushless motor 210 further comprises a rotor 406 rotatably supported inside the stator core 402 and having a permanent magnet magnetized in S-poles and N-poles alternately positioned on an outer circumference of the rotor 406.

While the present invention has been described above with reference to various embodiments, modifications and related manufacturing methods, it will be appreciated by those skilled in the art that various modifications and alternatives to those details could be developed in light of the overall teachings of the disclosure. For instance, although the stator cores of the brushless motors have been described above with reference to the structure having various numbers of poles, the present invention is not limited to such restrictions.

In addition, although the rotors of the brushless motors have been described with reference to the structure wherein the rotor surfaced formed with the magnetized poles, it will be appreciated that various types of rotors can be combined with the stator core of the brushless motor implementing the present invention. Moreover, it will be appreciated by those skilled in the art that various technologies for minimizing torque ripple can be applied to the brushless motor of the present invention. These technologies may include: a method of forming stator poles and rotor poles in smoothed shapes in circumferential directions; a method of smoothing the stator poles and the rotor poles in radial directions; and a method of positioning the rotor poles upon shifting parts of the rotor poles in a circumferential direction of a rotor so as to cancel torque ripple components.

In addition, the brushless motor according to the present invention can be implemented in various modes. That is, the brushless motor of the present invention may be implemented in an inner-rotor type motor, including a stator and a rotor between which an cylindrical air gap is defined, an outer-rotor type motor and an axial gap type motor incorporating a stator and a rotor spaced from the stator via a circular disc type air gap.

Further, the brushless motor of the present invention may be applied to a linear motor. Furthermore, the brushless motor of the present invention may be further modified so as to have a motor configuration that includes a stator and a rotor rotatably disposed therein via a tapered cylindrical air gap.

Moreover, the brushless motor of the present invention may be incorporated in a composite motor composed of a plurality of motors. For instance, the brushless motors of the present invention may be arranged in a radial structure wherein two motors are disposed in inner diametric side and an outer diametric side. In another alternative, a plurality of brushless motors implementing the present invention may be disposed in tandem fashion in a serial manner along an axial direction.

Besides, the brushless motor of the present invention may be further modified in a structure wherein a part of the motor is omitted and removed. The brushless motor may be composed of soft magnetic material made of silicon steel plates, amorphous magnetic steel plates or pressed powder magnetic core made by press forming soft iron powder. Especially for manufacturing a minimized motor implementing the present invention, the magnetic steel plates may be stamped in a stator core structure, which in turn is subjected to bending and forging operations thereby forming a three dimensional contoured component part that plays a role as a part of the component parts forming the brushless motor set forth above.

While the motor driving method has been described above under a premise that each phase excitation current has a sinusoidal waveform, it will be appreciated to those skilled in the art that drive current may be formed in other various waveforms than the sinusoidal waveform. The brushless motor, altered in such various modifications, may fall in concept of the present invention. Accordingly, the particular arrangements disclosed are meant to be illustrative only and not limited to the scope of the present invention which is to be given the full breadth of the following claims and all equivalents thereof.

What is claimed is:

1. A three-phase alternating current motor, comprising:
   a stator including first phase stator poles carrying thereon a first phase winding selected from a U-phase winding, a V-phase winding and a W-phase winding, second phase stator poles carrying thereon a second phase winding selected from the U-phase winding, the V-phase winding and the W-phase winding and third phase stator poles in the absence of a third phase winding selected from the U-phase winding, the V-phase winding and the W-phase winding; and
   a rotor rotatably supported inside the stator poles of the stator;
   wherein the first and second phase windings are excited with excitation currents produced from three-phase alternating currents, the excitation currents allowing the stator to electromagnetically generate a three-phase alternating electromagnetic action through which the rotor is driven;
   the stator having three stator poles formed in an area of an electrical angle of 360°; wherein
   the first and second phase windings comprise the U-phase winding and the W-phase winding, respectively, wherein the first phase stator poles carry the U-phase winding so as to form a coil end portion on one axial side of the stator and the second phase stator poles carry the W-phase winding so as to form another coil end portion on the other axial side of the stator such that the U-phase winding and the W-phase winding do not intersect with each other in a circumferential direction of the stator or in an axial direction of the rotor.

2. The three-phase alternating current motor according to claim 1, wherein:
   the stator includes U-phase stator poles that are formed in one of a substantially triangular shape and a substantially trapezoid shape.

3. The three-phase alternating current motor according to claim 1, wherein:
   the first phase stator poles include U-phase stator poles carrying thereon the U-phase winding and the second phase stator poles include V-phase stator poles carrying thereon the V-phase winding;
   each of the U-phase stator poles and the W-phase stator poles is formed in one of substantially triangular shapes and substantially trapezoid shapes; and
   the U-phase winding and the W-phase winding are wound on the U-phase stator poles and the V-phase stator poles in wave winding patterns, respectively; and
   the V-phase stator poles carry the third phase winding formed in a concentrated winding.

4. The three-phase alternating current motor according to claim 1, wherein:
   the stator includes a first V-phase winding placed in parallel to the U-phase winding and a second V-phase winding placed in parallel to the W-phase winding.

5. The three-phase alternating current motor according to claim 1, wherein:
   the first and second phase windings having end portions connected together at a neutral point; and
   the excitation currents are applied to the first and second phase windings and the neutral point.

* * * * *